May 20, 1952 L. R. RINEHART 2,597,375
WINDING MACHINE
Filed Feb. 19, 1946 14 Sheets-Sheet 3

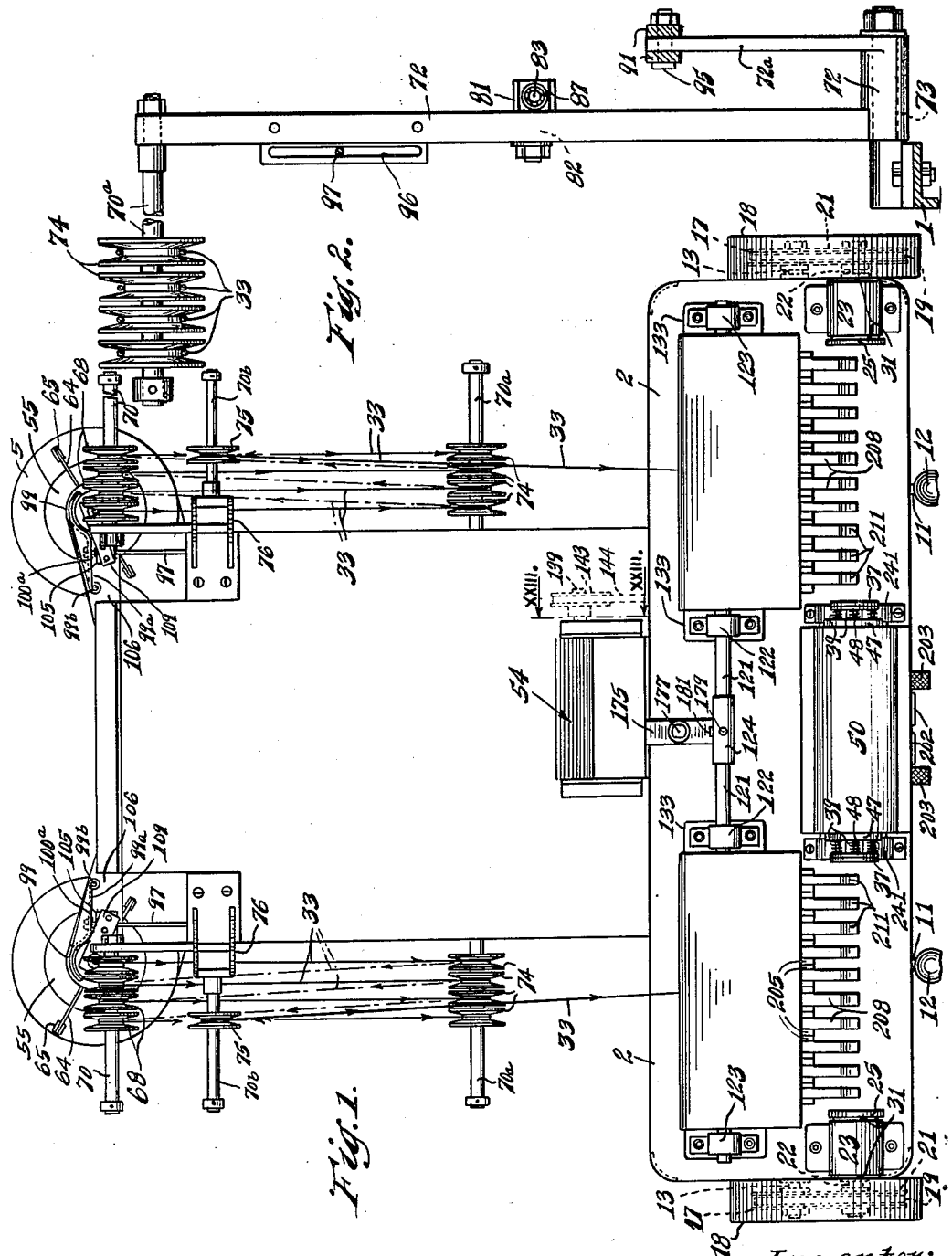

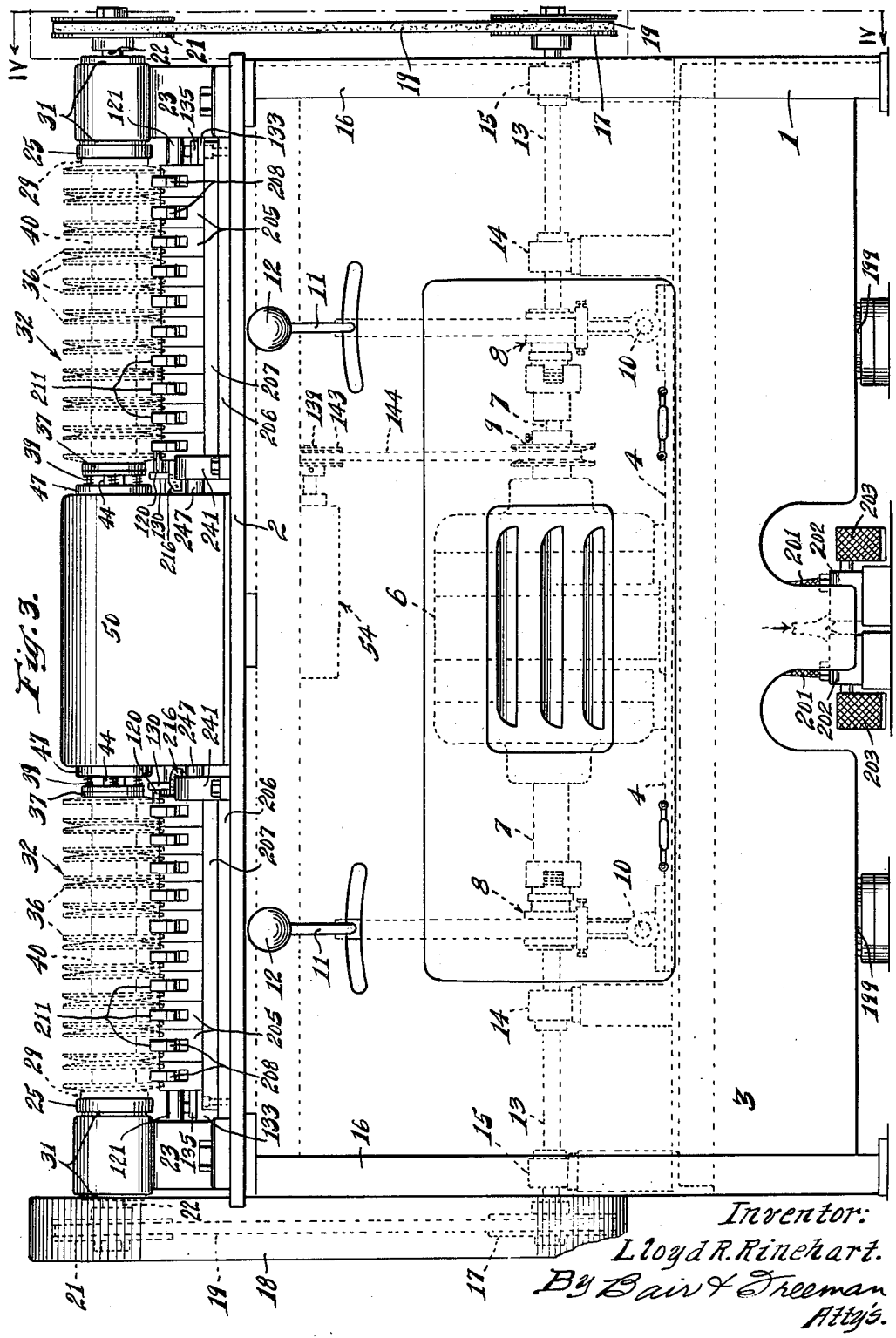

Inventor:
Lloyd R. Rinehart.
By Bair & Freeman
Atty's.

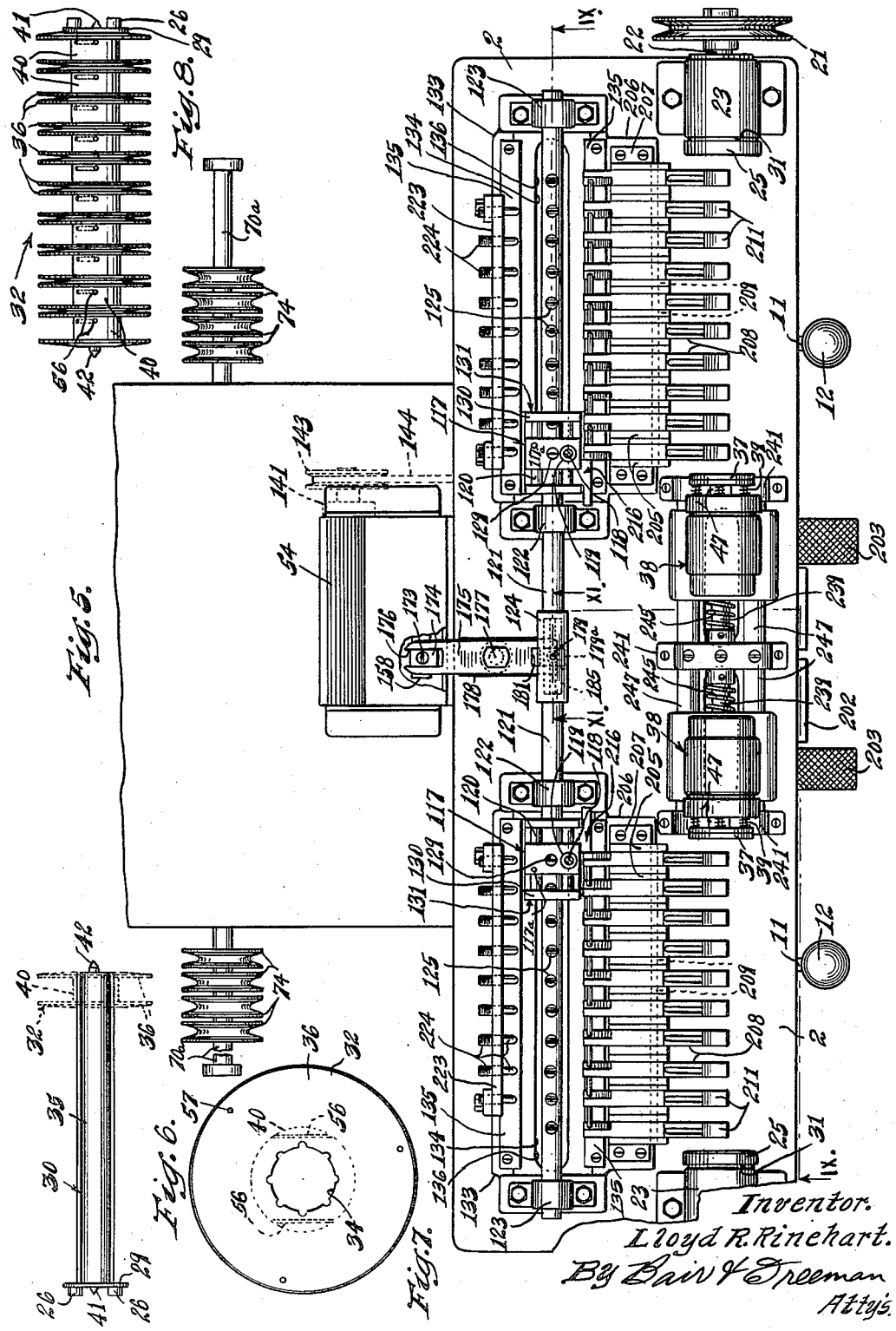

May 20, 1952     L. R. RINEHART     2,597,375
WINDING MACHINE
Filed Feb. 19, 1946     14 Sheets-Sheet 5
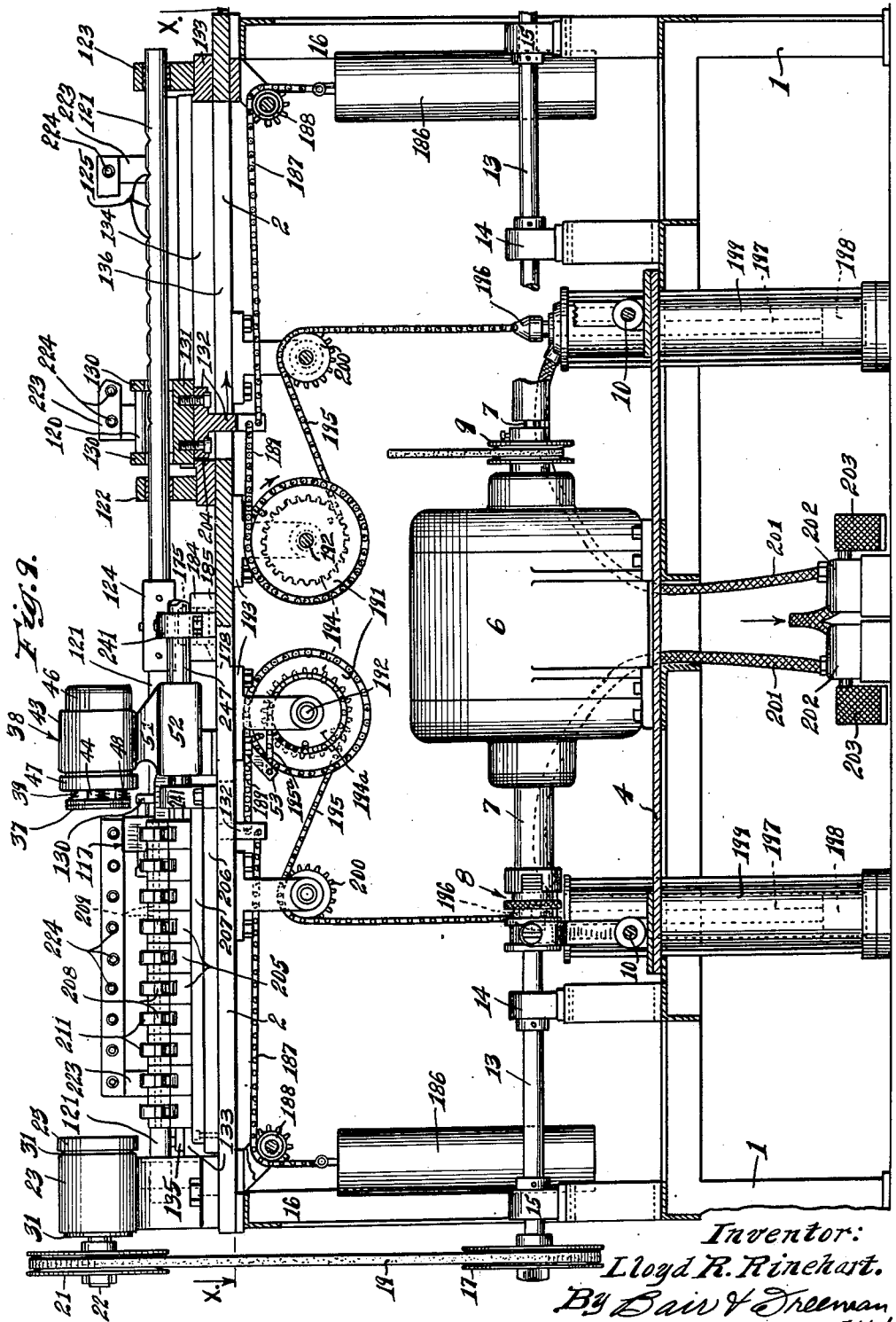
Inventor:
Lloyd R. Rinehart.
By Bair & Freeman
Attys.

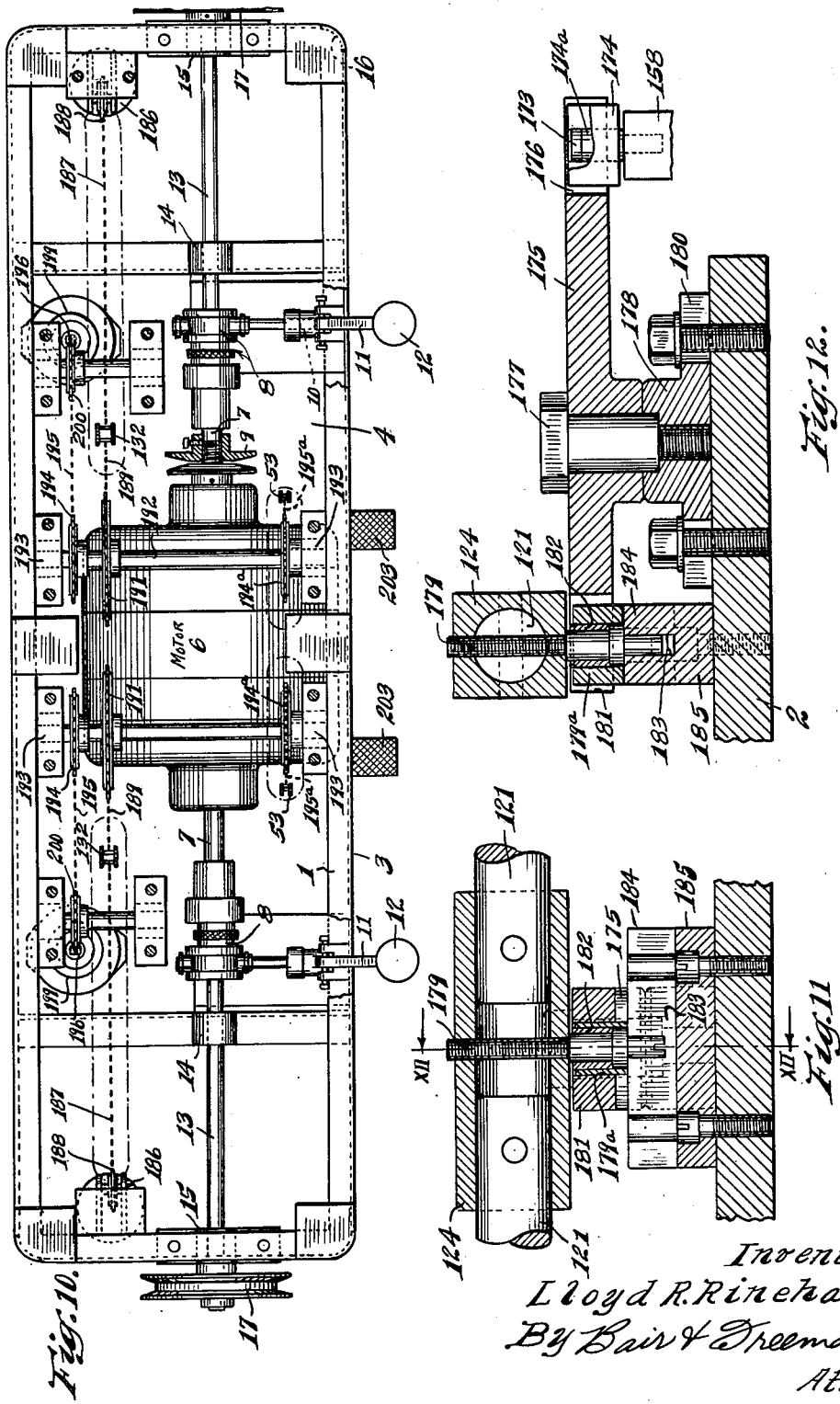

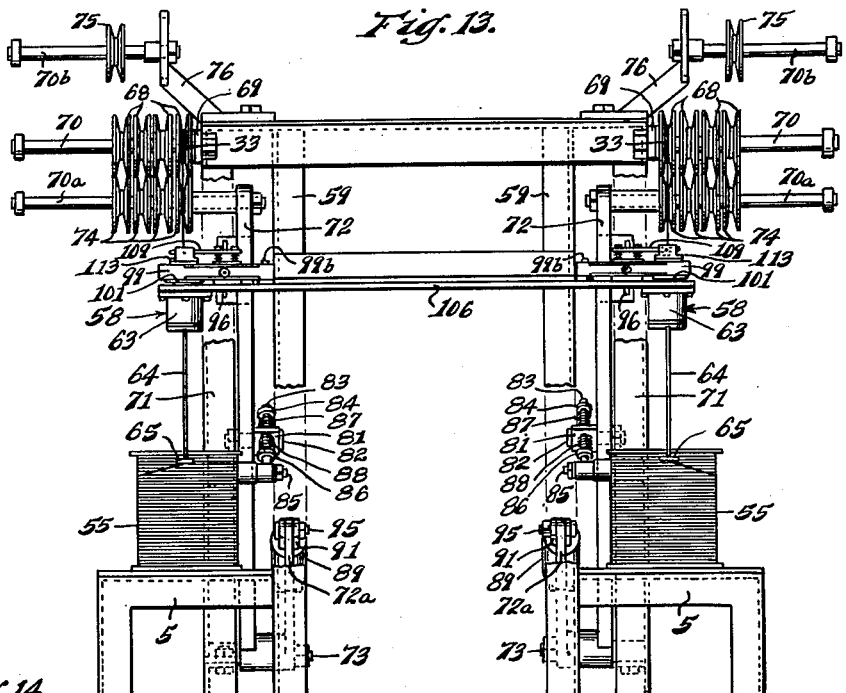
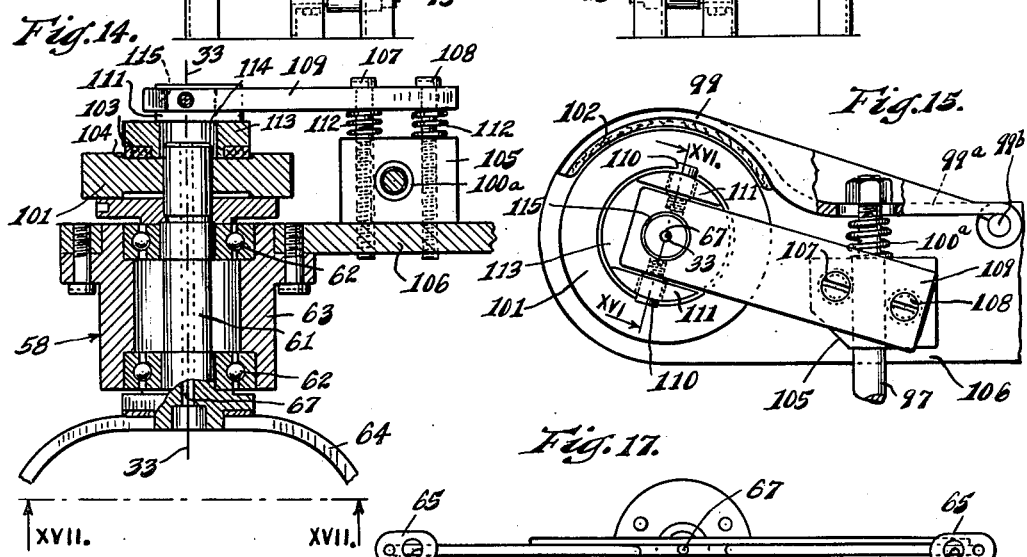
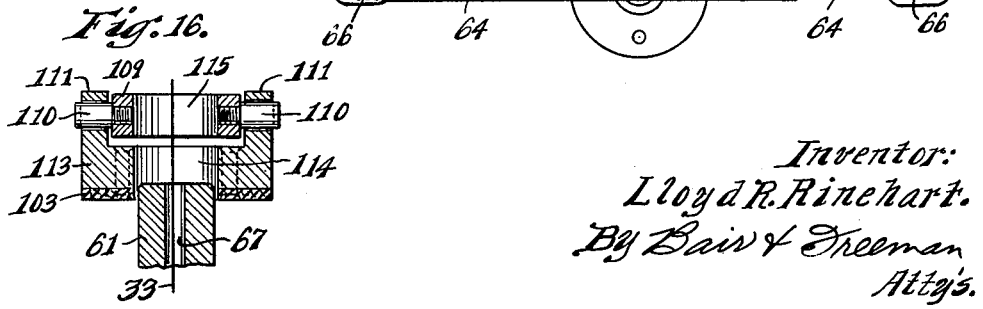

May 20, 1952  L. R. RINEHART  2,597,375
WINDING MACHINE
Filed Feb. 19, 1946  14 Sheets-Sheet 8
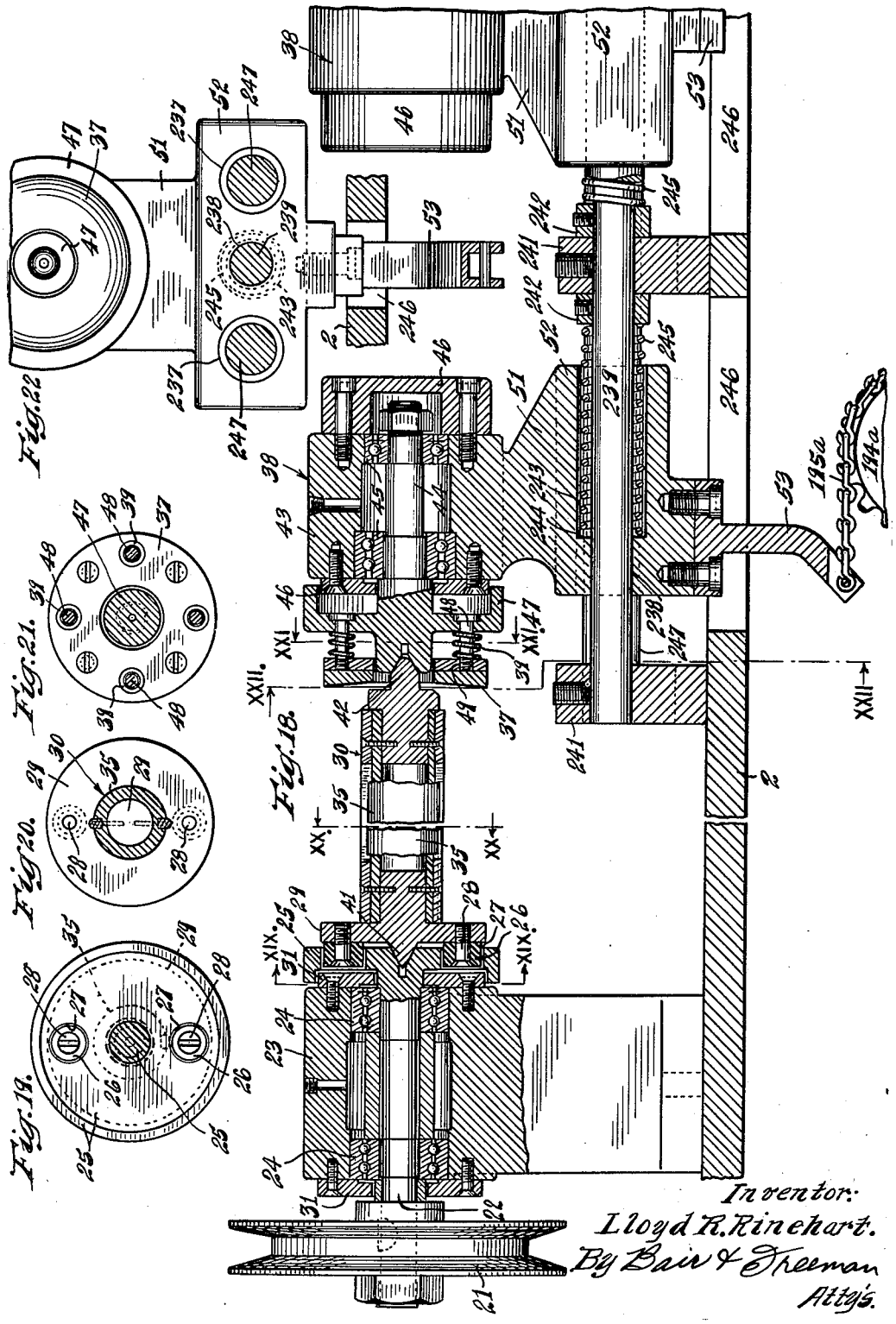
Inventor:
Lloyd R. Rinehart.
By Bair & Freeman
Attys.

May 20, 1952 — L. R. RINEHART — 2,597,375
WINDING MACHINE
Filed Feb. 19, 1946 — 14 Sheets-Sheet 9
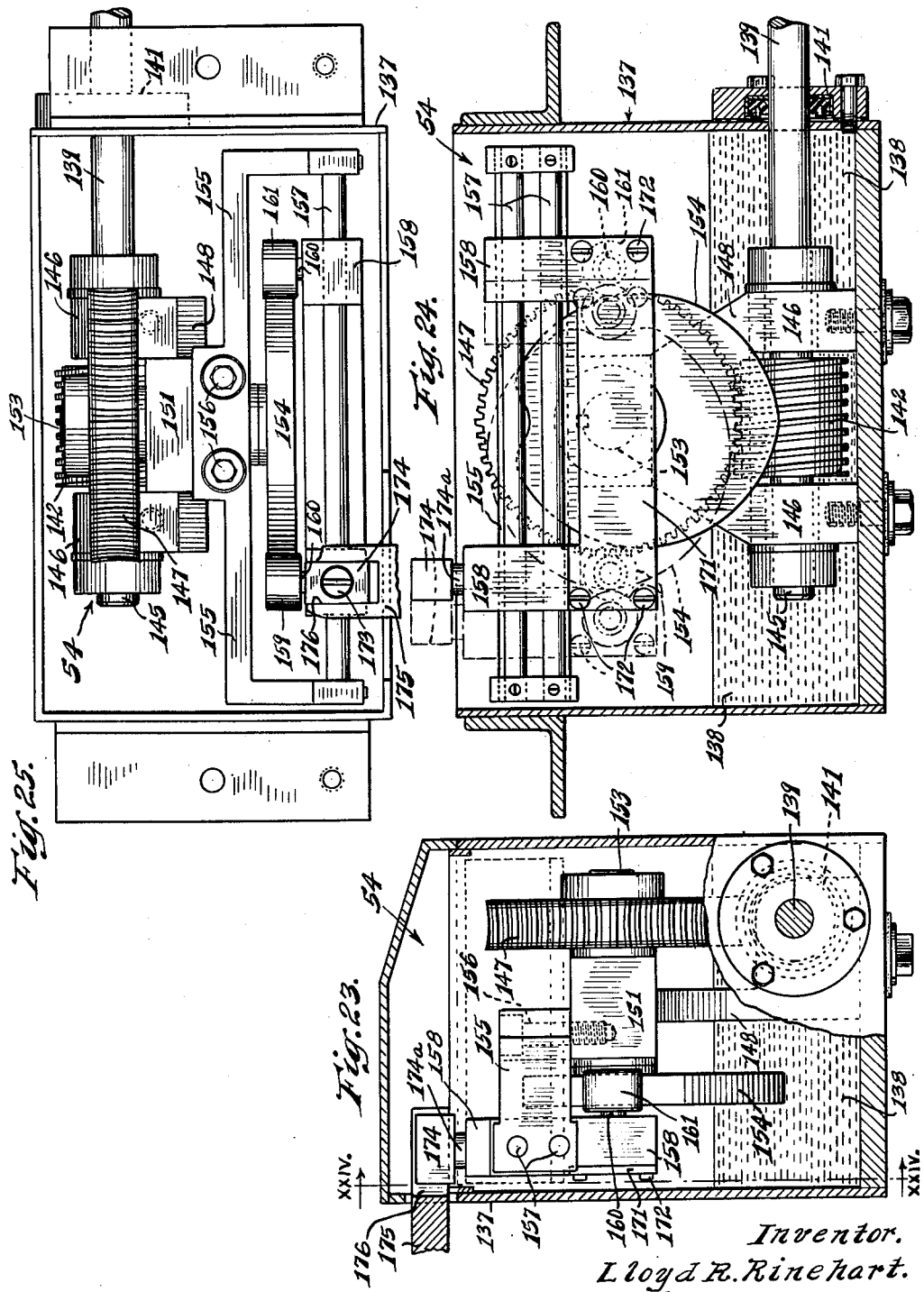
Inventor.
Lloyd R. Rinehart.
By Bair & Freeman
Attys.

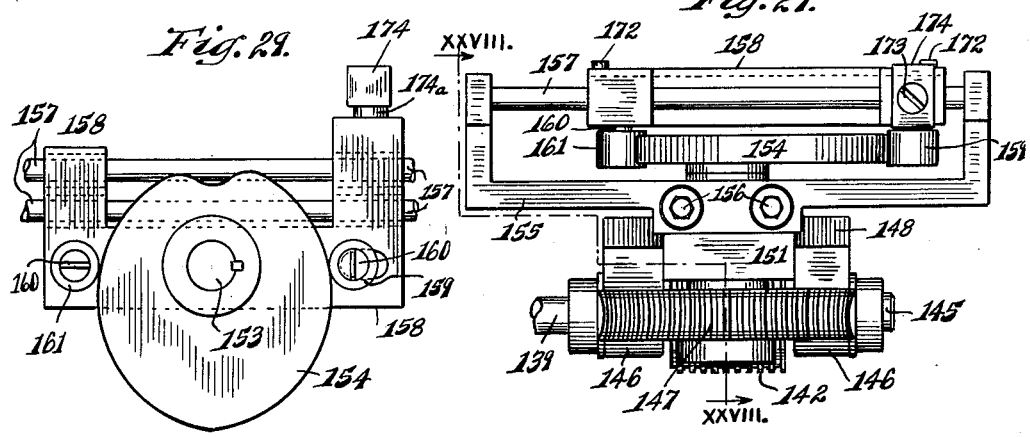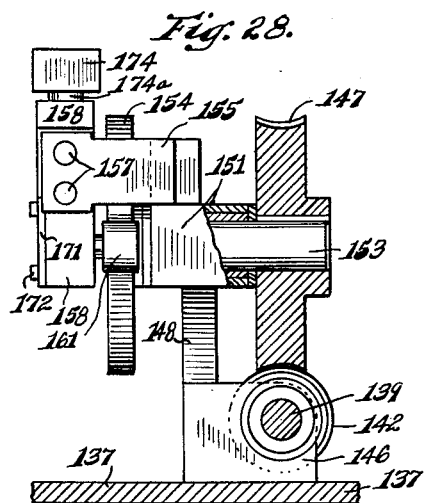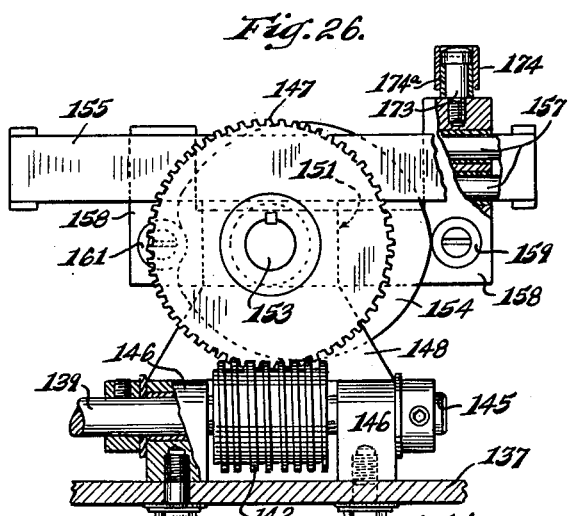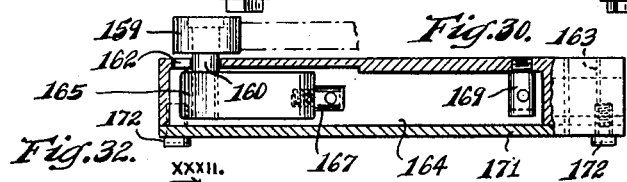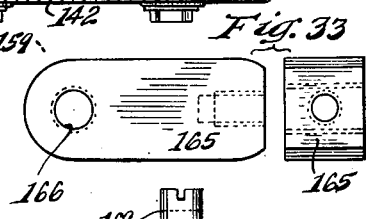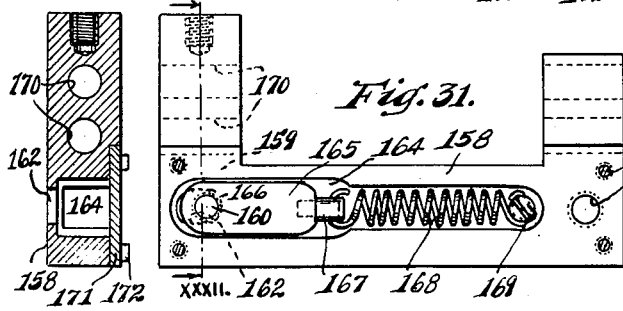

May 20, 1952  L. R. RINEHART  2,597,375
WINDING MACHINE
Filed Feb. 19, 1946  14 Sheets-Sheet 11

Inventor:
Lloyd R. Rinehart
By Baird & Freeman
Atty's.

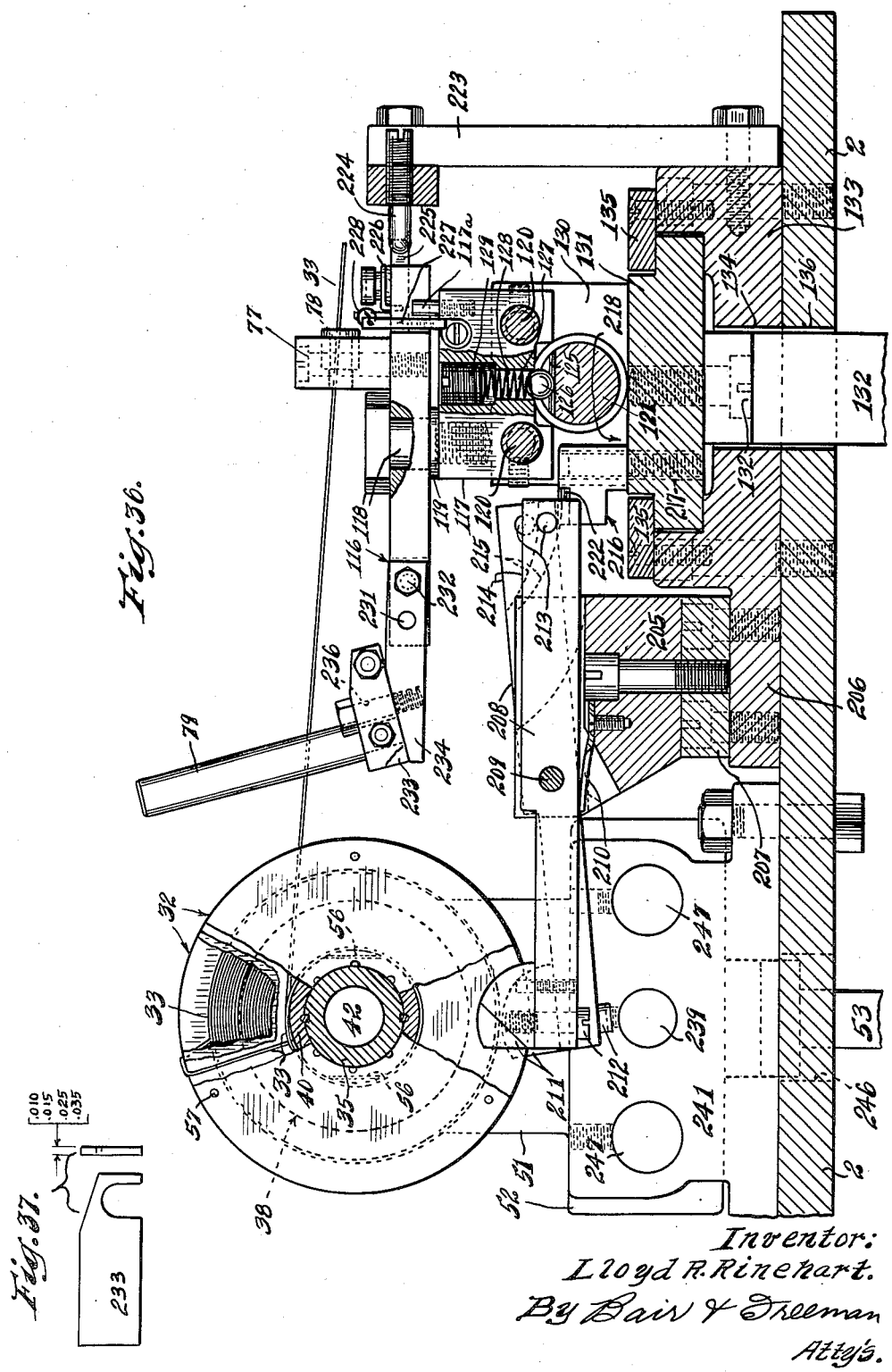

May 20, 1952 L. R. RINEHART 2,597,375
WINDING MACHINE
Filed Feb. 19, 1946 14 Sheets-Sheet 13
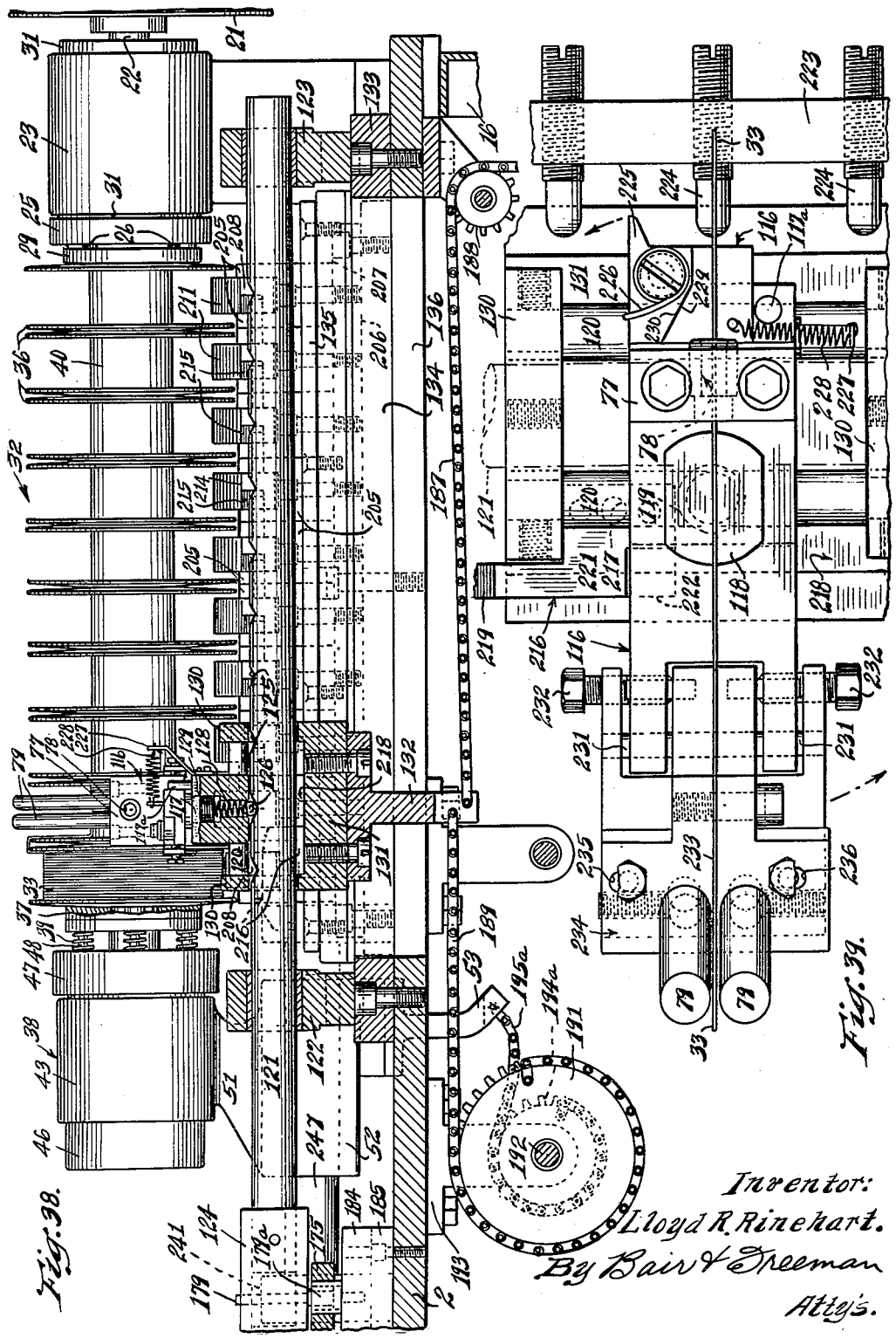
Inventor:
Lloyd R. Rinehart.
By Bair & Freeman
Attys.

Inventor:
Lloyd R. Rinehart.
By Bair & Freeman
Attys.

Patented May 20, 1952

2,597,375

UNITED STATES PATENT OFFICE 2,597,375

WINDING MACHINE

Lloyd R. Rinehart, Dixon, Ill., assignor, by mesne assignments, to National-Standard Company, a corporation of Michigan Application February 19, 1946, Serial No. 648,728

11 Claims. (Cl. 242—25)

This invention relates to winding machines, and particularly to a machine for winding a line of wire or thread on a plurality of bobbins or cores during each complete cycle of the machine.

It is an object of the invention to provide an improved multiple bobin or core winding machine in which a large number of such devices may be wound with wire or thread during each complete cycle of the machine and wherein breakage of the line being wound is minimized.

It is another object of the invention to provide improved mechanism for varying the rate of feed of the line being wound as the bobbins or cores are filled with successive layers of such material.

It is also an object of the invention to provide improved brake means and operation thereof for the line feeding mechanism.

It is an object of the invention to provide a variable speed distributing mechanism for different diameters of wire, so that the layers on the bobbins will be evenly laid side by side.

It is also an object to provide a distributing mechanism which lays the wire on bobbins in smooth layers and gets more wire on each bobbin than former machines.

It is an object of the invention to provide improved and fool-proof indexing mechanism for transferring the winding operation from one bobbin or core to the next bobbin or core to be wound.

It is still another object of the invention to provide a very simple mechanism for imparting movement to the indexing mechanism and for returning the indexing mechanism to its initial or starting position.

It is a further object of the invention to provide an improved feeding mechanism for the line to be wound between the reel containing the material and the distributor.

It is an important object of the invention to provide novel mechanism for quickly transferring the winding of the line from one bobbin or core to the next without stopping the machine.

It is also an object of the invention to provide mechanism for lifting the follower mechanism as each bobbin or core is wound and for retaining the follower mechanism in the lifted position.

It is also an object of the invention to provide a stop for the indexing mechanism at each station or desired increment of movement thereof.

It is another object of the invention to provide novel releasing mechanism for affording movement of the indexing mechanism from one station to another.

It is also an object of the invention to provide an improved arbor for a multiple winding machine, as well as a novel release and retaining mechanism for the arbor.

It is an object of the invention to provide a winding machine, and particularly a brake mechanism, which permits the use of a supply of line either from a spool or a hank.

It is a very important object of the invention to provide a multiple core winding machine which greatly decreases the cost and labor of winding cores over machines heretofore used, particularly over single core winding machines.

It is also an important object of the invention to provide a multiple bobbin winding machine which is capable of winding relatively large size bobbins, thereby reducing labor costs in applying the bobbins to a wire screen weaving machine, for example.

It is another object of the invention to provide a core winding machine which may be started at substantially full speed to wind cores, even with relatively fine wire, thus eliminating the necessity for the operator to slowly engage the clutch.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Fig. 1 is a top plan view of a multiple bobbin winding machine;

Fig. 2 is a side view of a pivoted brake lever and parts associated therewith;

Fig. 3 is a front view of the machine with the bobbin arbor in dotted lines and parts of the casing broken away;

Fig. 5 is a plan view of the front portion of the machine with the headstock, tailstock and indexing mechanism enlarged;

Fig. 6 is a side view of the arbor with one bobbin in dotted lines;

Fig. 7 is a side view of one of the bobbins;

Fig. 8 is a view of the arbor after assembly;

Fig. 9 is a front view of the machine, partly in section taken on line IX—IX of Fig. 5;

Fig. 10 is a sectional view taken below the top of the table plate on line X—X of Fig. 9;

Fig. 11 is a sectional view of the shuttle rod connector guide block taken on line XI—XI of Fig. 5;

Fig. 12 is a sectional view taken on line XII—XII of Fig. 11;

Fig. 13 is an elevational view of the rear part of the machine taken on line XIII—XIII of Fig. 4;

Fig. 14 is a sectional view of the wire unwinding device taken on line XIV—XIV of Fig. 4;

Fig. 15 is a top view of the wire unwinding device;

Fig. 16 is a sectional view of the friction disc and lever taken on line XVI—XVI of Fig. 15;

Fig. 17 is a bottom view of the rotating unwinding guide arm taken on line XVII—XVII of Fig. 14;

Fig. 18 is a sectional view of the headstock, arbor driver and tailstock taken on line XVIII—XVIII of Fig. 4;

Figs. 19, 20, 21 and 22 are sectional views taken on lines XIX—XIX, XX—XX, XXI—XXI, and XXII—XXII, respectively of Fig. 18.

Fig. 23 is an end view of the machine with parts broken away taken on line XXIII—XXIII of Fig. 1 and shows a housing with the distributor mechanism and heart shaped cam therein;

Fig. 24 is a view of the distributor in the housing taken on line XXIV—XXIV of Fig. 23 with the cover of the housing broken away, the dot and dash lines showing the cam and rollers in one of their positions;

Fig. 25 is a top plan view of the distributor with the top of the housing removed;

Fig. 26 is a front view of the distributor with parts broken away showing the gear and worm drive and the mounting thereof in its housing;

Fig. 27 is a top plan view of the structure shown in Fig. 26;

Fig. 28 is a partial sectional view taken on line XXVIII—XXVIII of Fig. 27;

Fig. 29 is an elevational view of the cam and cam follower carrier;

Fig. 30 is a sectional view of the cam follower carrier;

Fig. 31 is an elevational view of the cam follower carrier with the cover plate removed;

Fig. 32 is a sectional view of the cam follower carrier taken on line XXXII—XXXII of Fig. 31;

Fig. 33 is a top and end view of the cam follower block;

Fig. 34 is a view of the spring stud;

Fig. 36 is a sectional view taken on line XXXVI—XXXVI of Fig. 35 showing the indexing mechanism and flipper assembly relative to a bobbin;

Fig. 37 is a front and side view of a shim for various thicknesses of wire.

Fig. 38 is a sectional view of the indexing mechanism and flipper assembly in the second bobbin winding position, taken on line XXXVIII—XXXVIII of Fig. 35;

Fig. 39 is an enlarged plan view of the flipper assembly showing the flipper strike block and flipper pin;

*Frame and main drive*

Figure 4:
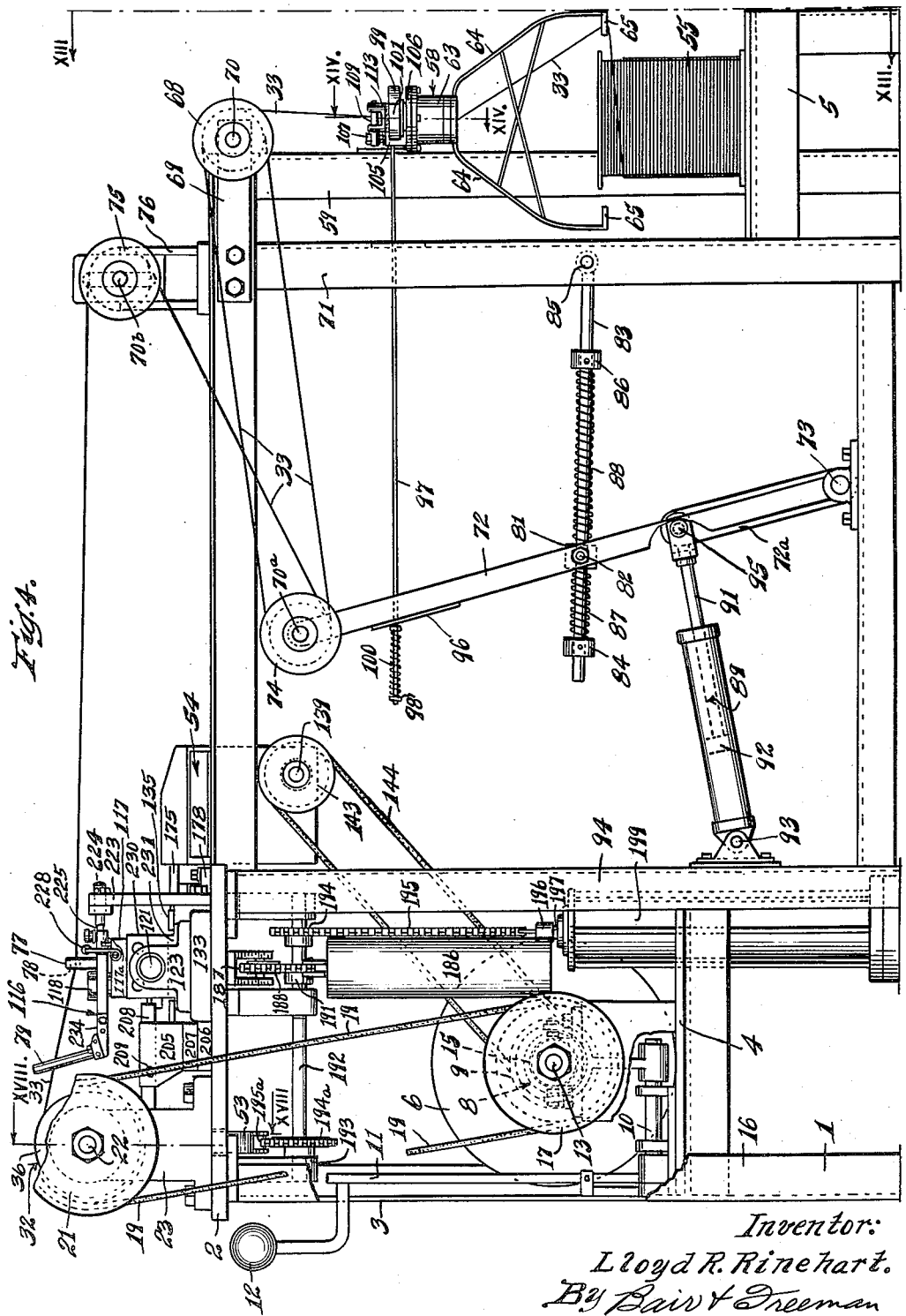
Fig. 4 is a view with parts broken away and the outside casing removed, taken on line IV—IV of Fig. 3.

The machine illustrated in the drawings is designed to wind wire on the core of a plurality of bobbins, and the description will be confined to that machine. However, it will be obvious that the machine may be used for winding a line of thread, twine, or the like, and with a slight modification of the arbor, may be used to wind cores for solenoids, condensers or the like. I therefore, do not wish to be limited to either wire or bobbins, per se, except as such limitations may appear in the appended claims.

Referring specifically to the drawings for a detailed description of the invention, and particularly to Figures 1 to 4 inclusive and 9, a multiple bobbin winding machine is illustrated wherein a frame, generally indicated by the numeral 1 supports a bed plate 2 and an enclosing cabinet 3. The frame 1 is also provided with an internal intermediate supporting member 4 and an external supporting member 5. The frame 1, bed plate 2, and supporting members 4 and 5 support the operating parts of the machine.

An electric motor 6 is mounted on the internal supporting member 4 and is provided with oppositely extending shafts 7, each of which is provided with a conventional manually operated clutch 8. A variable speed driving pulley or sheave 9 is provided on one of the shafts 7, as best seen in Figures 3 and 9 and 10. The speed of the belt driven by the pulley 9 is varied by changing the spacing between the fixed and movable part of the sheave, as is well understood in the art. Manually operable levers 11 including handles 12 are provided for engaging and disengaging each clutch 8 and extend upwardly from the clutches and exteriorly of the front of the cabinet 3; so that they are readily accessible to the operator of the machine. The manually operated levers 11 are pivoted at 10 on member 4. A pair of shafts 13 are driven by the clutches 8 and are journalled in bearings 14 and 15 supported on the internal supporting member 4 and uprights 16 of frame 1, respectively. The shafts 13 extend exteriorly of the sides of the cabinet 3 and are provided with driving pulleys 17 at their outer extremities. A guard 18 is preferably provided at each side of the cabinet 3 to cover the pulleys 17 and belts 19 driven thereby.

The belts 19 drive pulleys 21, which in turn drive shafts 22 extending into head-stock assemblies generally indicated by the numeral 23. The head-stock assemblies are mounted on the bed-plate 2.

As best shown in Figures 3, 9, and 18 and 22, the shaft 22 extends through the head-stock assembly 23 and is journalled in frictionless bearings 24 contained therein. The shaft 22 rotates a plate 25 provided with apertures 27 therein for the reception of fibre extensions 26 secured to a stop-plate 29 of an arbor generally indicated at 30 by screws 28. Cover plates 31 are bolted at each end of the head-stock assembly to retain lubricant in the bearings 24 and to exclude dirt and dust.

*Head-stock, tail-stock and arbor mechanisms*

As shown in Figures 6 to 8 inclusive, and 18, the arbor 30 has a plurality of bobbins 32 for wire 33 supported thereon. The bobbins 32 are each provided with a central circular hole 34 so that the bobbins may be slid over a keyed tubular member 35 of the arbor 30. The bobbins 32 are provided with flanges 36 and hubs or matrixes 40 and the first bobbin flange 36 is stopped by the stop plate 29, it being noted that the opposite end of the tubular member 35 has no plate associated therewith. The flanges 36 of adjacent bobbins abut against each other and the flange 36 of the last bobbin is held on the arbor 30 by a plate 37 on a tail-stock assembly 38, which plate 37 is biased toward the arbor and the bobbins thereon by springs 39. The tail-stock assembly 38 is supported by the bed plate 2.

Each end of the arbor 30 is provided with a centering stud 41 and 42. The arbor shown is adapted to hold ten bobbins, it being obvious that any desired number may be mounted on a single arbor. Furthermore, the machine illustrated is adapted to wind bobbins on two arbors 30 at one time, although the invention is not limited to such a number. Since the two sides of the machine are substantially identical, a description of one side will generally be sufficient.

The tail-stock assembly 38 comprises a casing 43 for retaining a stub shaft 44 journalled in frictionless bearings 45. Covers 46 are bolted to the ends of the casing 43 and the stub shaft 44 is connected to a rotatable plate 47, which is adapted to receive the centering stud 42 of the arbor 30. Bolts 48 extend through the rotatable plate 47 and are threaded into apertures 49 in plate 37. The bolts 48 are slidable in the plate 47 and have the springs 39 coiled around them to bias the plate 37 toward the arbor 30 to engage the flange 36 of the last bobbin and retain all the bobbins in place. The tail-stock casing 43 is provided with an extension 51 which connects with an apertured bearing member 52 having an operating handle 53 bolted thereto, for a purpose hereinafter described. A casing 50 covers both tail-stock assemblies 38.

It will be seen, therefore, that when the electric motor 6 is operating and the clutch 8 is engaged, that the belt 19 drives pulley 21 and head-stock shaft 22 to rotate the arbor 30 with the bobbins 32 thereon. It will be apparent, as the description proceeds, that this is the only drive for winding the wire 33 on the bobbins 32, with the exception of a single drive for a wire distributor shown generally at 54, and that it is the rotation of the bobbins 32 which effects the feeding of the wire from a wire supply spool or reel 55 disposed at the rear of the machine. (See Figure 4.) It will also be noted in Figure 7 that the bobbins 32 are provided with an aperture 56 in the hub 40 thereof for the reception of the end of the wire 33 prior to starting the winding of the first bobbin on each arbor. The bobbins 32 are also provided with a number of holes 57 in the flanges 36 thereof so that when the wire 33 is cut, the cut end is placed in one of the holes 57, so the wire on the bobbin will not unwind.

Wire feeding mechanism

As best shown in Figures 1, 2, 4 and 13, the feeding of the wire 33 from the spools or reels 55 to the bobbins 32 is accomplished by the following means, it being understood that two reels 55 are provided, one for supplying wire to a single bobbin 32 on each of the two arbors 30, and that the mechanisms for feeding the wire to each arbor are identical.

The spool or reel 55 is fixedly supported on the external supporting member 5 in an upright position, as best shown in Figure 4. A wire unreeling mechanism, generally indicated at 58, is supported on a rear upright 59 of the frame 1. The unreeling mechanism is shown in detail in Figures 14 to 17, inclusive, and comprise a spindle 61 journalled in bearings 62 contained in a housing 63. The lower end of the spindle 61 is attached to an unreeling arm 64 of inverted U-shape. The unreeling arm is provided with inturned extensions 65 at the lower extremities thereof. The inturned extensions 65 are each provided with an opening 66 through either one of which wire from the reel 55 is led. As wire is drawn by the rotation of the bobbins 32, the unreeling arm 64 is rotated on the spindle 61 and wire is thereby withdrawn or unreeled from the reel 55.

The spindle 61 is provided with a central bore 67 through which the wire 33 extends. The wire 33 is then led to a plurality of sheaves 68 mounted on a fixed sheave bracket 69, which bracket is in turn supported by upright 71 of the frame 1. A shaft 70 is provided for the sheaves 68 so they may slide horizontally thereon. A brake arm 72, pivoted at 73, is spaced from the sheave 68 and is provided with sheaves 74 at its upper extremity. A shaft 70a is provided for the sheaves 74 so they may likewise slide horizontally thereon. As best shown in Figure 1, there are three fixed sheaves 68 and also four sheaves 74 on the arm 72. The wire 33 from the bore 67 of the spindle 61 passes back and forth over the sheaves 68 and 74 and is led from the outermost sheave 74 to single sheave 75 mounted on a fixed bracket 76 on the top of the frame 1. A shaft 70b is likewise provided for sheave 75 so it may slide horizontally. The wire passes over the fixed sheave 75 to a wire guide member 77 having an aperture 78 therein through which the wire is led, then past wire guide arms 79 to the bobbin 32. The wire guide 77 and the wire guide arms 79 are oscillated through a fixed horizontal distance by distributing member 54, in a manner hereinafter more fully described, in order to distribute each layer of wire on each bobbin. Since the sheaves 68, 74 and 75 may all slide horizontally on the shafts 70, 70a and 70b, respectively, the sheaves may assume a position substantially in front of the bobbin being wound and the oscillations aforementioned are also followed.

Brake mechanism

As the wire on the bobbin being wound begins to fill up the bobbin, it is apparent that the wire is withdrawn at a faster rate from the reel 55 because the circumference of each layer of wire added to the bobbin increases. The wire must be kept taut and if the changes in the rate of feed in the wire from the reel were uncompensated, the wire would have a tendency to snarl as it left the reel. This is particularly true when the wire jumps from a full bobbin to an empty one. The compensating mechanism is best shown in Figures 1, 2, 4, and 13 to 17 inclusive, and comprises the following.

The pivoted brake arm 72 is provided with a spring rod block 81 pivoted to the arm 72 at 82 and has a horizontal spring rod 83 secured thereto. The spring rod 83 extends outwardly in two directions of the arm 72 and one end is provided with a collar 84 which is preferably adjustable. The other end of the spring rod 83 is secured to the frame upright 71 by a pivoted connection 85 and a second adjustable collar 86 is disposed between the pivoted connection 85 and the brake arm 72. A coil spring 87, which may be under compression, is disposed between the block 81 and collar 84 and a second and stronger coil spring 88, always under compression, is disposed between block 82 and the second collar 86. The adjustability of the collars affords variation of the compression of the springs 87 and 88, so that the forces acting on the brake arm 72 may be properly balanced.

A snubber 89, preferably of the hydraulic type, comprises a piston element 91 and a cylinder 92, with its valve (not shown) in the piston rod end of the cylinder 92. The cylinder 92 is pivoted at 93 to an upright 94 and the piston element 91 is pivoted at 95 to an arm 72a secured to the brake arm 72. The purpose of the snubber 89 and spring 87 is to slow down or smooth out the movement of the brake arm 72.

The brake arm 72 is provided with a vertical slot 96 adjacent the upper end thereof. A horizontal spring biased brake rod 97 extends through the slot 96 and is provided with a stop collar 98 at one end thereof. A coil spring 100 is disposed between the stop collar 98 and the sides of slot 96. The brake rod 97 is biased away from the unreeling mechanism by the spring 100 which biases a brake band 99 to which the brake rod 97 is attached, toward a braking position with respect to a disc 101 which rotates with spindle 61, being keyed thereto. Frictional brake material 102 is secured to the brake band 99 to engage the rotating disc 101 at the proper time and stop or considerably retard the rotation of the disc. A spring 100a is disposed between an arm 99a pivoted at 99b of brake arm 99 and a threaded block 105. The spring 100a tends to keep the brake shoe 99 in a disengaged position from the disc 101, and is sufficiently strong to normally overcome the bias of spring 100.

A threaded block 105 is secured to an extension 106 of the spindle housing 63 for the reception of two screw headed bolts 107 and 108. The bolts 107 and 108 are extended through a rectangular brake plate 109 which is supported in upper ears 111 by pins 110. The bolts 107 and 108 are threaded into block 105. Coil springs 112 encompass the bolts 107 and 108 and are disposed between the block 105 and the plate 109. A brake shoe 113 with brake material 103 attached thereto is pivotally secured to the brake plate 109 by pins 110 and engages the disc 101 at all times in order to provide resistance to the rotation of the unreeling arms 64 to thereby retain the wire 33 taut as it is unreeled. The bolts 107 and 108 provide an adjustment for the amount of pressure exerted by the brake shoe 113. This second brake comprising brake plate 109, shoe 113 and frictional brake material 103 may be dispensed with if not found necessary. It is not essential to the operation of the machine except under unusual conditions.

The brake shoe 113 and the brake plate 109 are provided with bores 114 and 115, respectively, through which the wire 33 extends as it is led to the first of the sheaves 68.

The brake arm 72 is biased slightly toward the left in Fig. 4 by the action of the stronger spring 88, and when wire 33 is being withdrawn at a low speed, the parts are in the position shown in Fig. 4. As a bobbin 32 fills up, the rate of feed of the wire increases and the increased tension thereon draws the brake arm 72 toward the right in Fig. 4, thereby progressively loading spring 88. Obviously the action of the snubber 92 and spring 87 smoothes out any rapid movement or shock of the brake arm 72. At this time, the brake arm 99 is at all times retained out of engagement with disc 101. The only time the brake is put on, in normal operation, is when the wire is flipped from one bobbin to another or if the wire accidentally breaks, as more fully described hereinafter.

*Wire winding and distributing mechanism*

Referring now to the mechanism for winding wire on the bobbin 32 and for distributing the wire on each bobbin, as best shown in Figs. 35, 36, 38 and 39, a washer 119 is disposed between the assembly 116 and the pivot block 117. One such assembly and pivot block is provided for each arbor 30.

Figure 35:
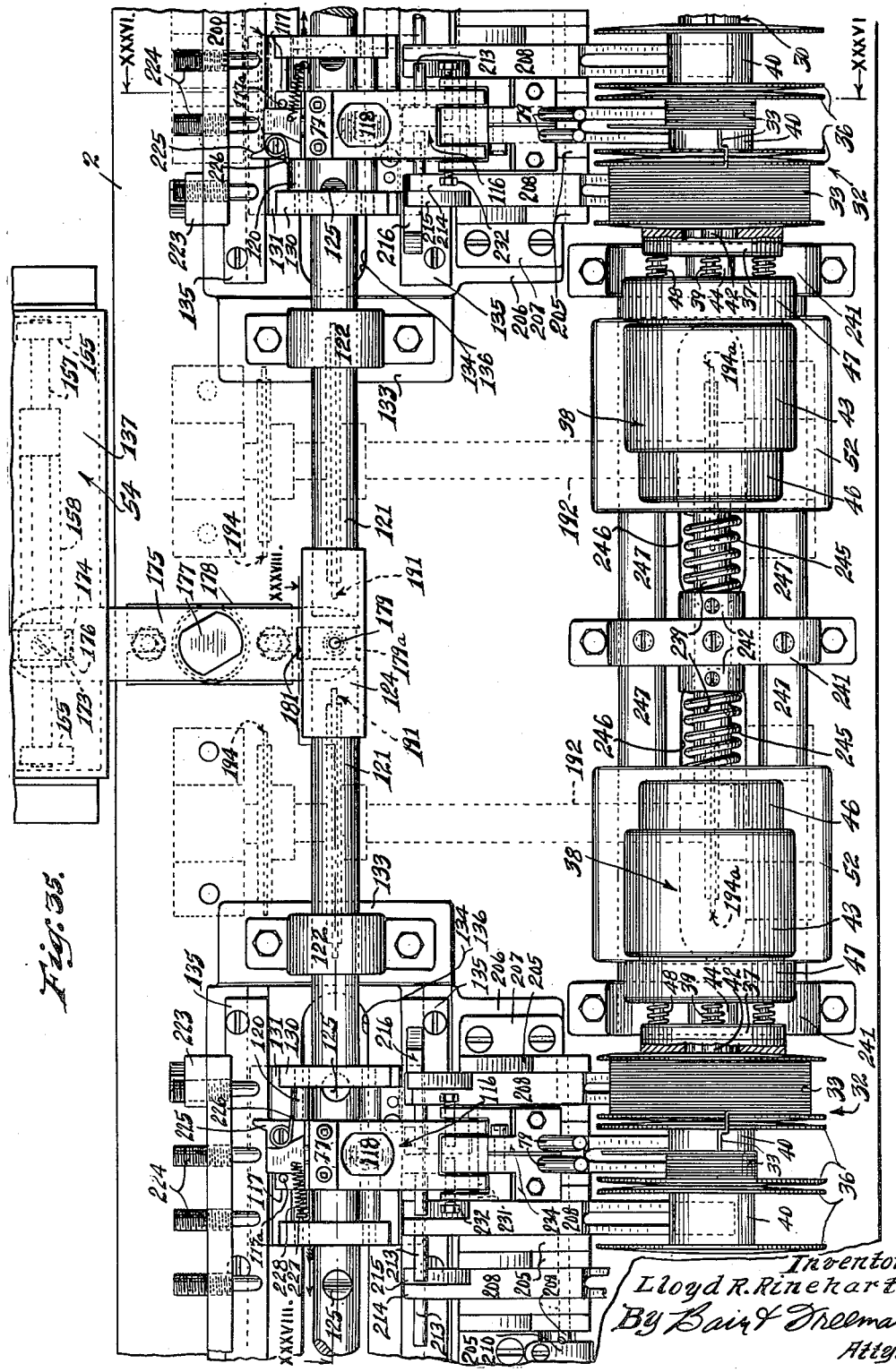
Fig. 35 is a plan view of the right and left hand tail stocks and portions of the indexing mechanism showing the first bobbins wound and the second bobbins winding.

As best shown in Figs. 9 and 35, a pair of oscillating shuttle or distributor rods 121 are journalled in bearings 122 and 123 mounted on the bed plate 2 and these rods are rigidly connected together at their inner extremities by a sleeve 124, as best shown in detail in Figs. 11 and 35. The shuttle rods 121 are provided with a plurality of notches 125, as shown in Figs. 9 and 38, one for each bobbin station, for reasons more fully described hereinafter. As shown in Figs. 36 and 38, the pivot block on each rod 121 is held in releasable engagement with the rod 121 by a ball 126 which is pressed downwardly by a spring 127, which spring is held in position within a cavity 128 in the pivot block 117 by a stud 129. As shown in Figs. 36 and 38, the pivot block 117 is part of an index slide block 131 which has attached thereto an extension 132. Inverted U-shaped bridge members 130 are secured to the slide block 131 and extend above the shuttle rod 121. The index slide block 131 slides on a base 133 having a longitudinally extending slot 134 therein, through which the extension 132 extends. Guide blocks 135 on base 133 guide the movement of the index slide block 131 and extension 132. A corresponding slot 136 is also provided in the bed plate 2 for extension 132.

Assuming that the machine is in the condition shown in Figs. 35 and 38, that is, one bobbin 32 is wound and the second bobbin 32 is being wound, the shuttle rods 121 are oscillated by the distributor mechanism 54, in order to oscillate the wire guide and flipper assembly 116 on rods 120 provided on slide block base 133, it being obvious that the assembly is held in the second notch 125 by the ball 126 and spring 127. The oscillating movement of the assembly 116 guides the wire 33 so that it is wound in even layers on the bobbins 32.

The distributor mechanism 54 is shown in detail in Figs. 23 to 34 inclusive, and details of associated parts are shown in Figs. 7, 11, 12 and 35.

Referring first to Figs. 23 to 34 inclusive for a detailed description of the distributor mechanism 54, the mechanism is contained in a sealed casing 137 having oil 138 therein, preferably up to the dotted line in Fig. 23 designated as "oil level." A shaft 139 extends through a fluid tight gland 141 in the casing 137 and drives a worm gear 142 therein. As shown in Fig. 4, the shaft 139 is driven by a pulley 143, which in turn is driven by a belt 144 driven by variable speed pulley 9 on motor shaft 7. It is apparent, therefore, that the shaft 139 and worm gear 142 are driven at all times when the electric motor 6 is operated regardless of the position of the clutches 8.

The worm 142 is supported on a shaft 145 which is driven by shaft 139 and is journalled in bearing 146 secured to the bottom of the distributor casing 137 and drives a worm gear 147 therein. A support 148 for bearing 151 is secured to the fixed portion of bearings 146, which bearing 151 provides a support for a shaft 153 keyed to the gear 147. A heart shaped cam 154 is secured to the shaft 153 and is rotated by the gear 147. The shape of the cam 154 is best shown in Figs. 24 and 29, and the dotted lines in Fig. 24 illustrate the position of the distributor parts, including the cam 154, at one time during the cycle of operation.

A rigid U-shaped bracket 155 is bolted at 156 to the top of the stationary shell of bearing 151 and supports a pair of vertically spaced slide rods 157. Slidably mounted on the slide rods 157 is a cam follower mechanism generally indicated at 158 and including rollers 159 and 161, which follow the contour of the cam 154 and move the cam follower 158 back and forth on slide rods 157 in the following manner:

Referring particularly to Figs. 30 to 34 inclusive, the rollers 159 and 161 are provided with stub shafts 160 which are journalled in openings 162 and 163 in the cam follower 158, the slot 162 being elliptical to permit lateral movement of the stub shaft 160 on roller 159. The opposite face of the follower block 158 is slotted at 164 and a roller block 165 is inserted therein. One end of the roller block 165 has a hole at 166 therein, and the shaft 160 of roller 159 is engaged thereby. The opposite end of the roller block 165 is provided with a slotted stud 167 which engages one end of a tension spring 168, the other end of the tension spring being retained in position by a threaded stud 169. A plate 171 is secured to the cam follower 158 by bolts 172 and covers the roller block 165 and spring 168. One arm of the U-shaped cam follower 158 is slightly longer than the other to provide a cavity for receiving and retaining a stub shaft 173 of a pivoted block 174. A roller 174a is disposed between the shaft 173 and block 174. The arms of the U-shaped cam follower also are provided with openings 170 for sliding on the slide rods 157 of the bracket 155.

As shown in Figs. 5, 11, 12 and 35, the pivoted block 174 is pivotally connected by a forked pivot 176 on the lever 175. The shuttle rod operating lever 175 is pivoted intermediately thereof on a fixed pivot comprising a pivot stud 177 threaded into a boss 178 bolted to the bed plate 2. The opposite end of the shuttle rod operating lever 175 is pivotally connected to a pin 179 by a forked connection 181, which pin extends through sleeve 124, whereby movement of the pin 179 imparts movement to the shuttle rods 121. A roller 182 surrounds the pin 179 and engages a block 179a which is engaged by the forked connection 181. The lower end of the pin 179 is inserted in and oscillates in an elongated slot 183 in a block 184 which is integral with a block 185 secured to the bed plate 2.

It will be apparent, therefore, that as the cam 154 is rotated by the gears 142 and 147, the rollers 159 and 161 follow the contour of the cam 154 and oscillate the cam follower 158. The pivot block 174 is oscillated by the movement of the cam follower 158 and oscillates the end of the shuttle rod operating lever 175 about the fixed pivot stud 177 to thereby oscillate the pin 179 and the shuttle rods 121 through a limited distance in the bearings 122 and 123.

When the cam 154 is in the upright position, i. e., with the cam depression notch either up or down on a perpendicular line, the cam follower 158 and the wire guide and flipper assembly 116 are centered. When one or the other rollers 159 and 161 enter the cam depression, the follower 158 and assembly 116 are moved to the left or right, obviously in opposite directions.

As best shown in Figs. 12 and 35, the boss 178 for the pivot stud 177 is provided with slots 180 so that the position of the pivot stud 177 may be changed with respect to the movable pivots, thereby varying the stroke of the shuttle rods 121, so that different size cores or bobbins 32 may be wound.

It is also clear that the variable speed sheave 9 affords a variable speed distributor 54 so that the various thicknesses of wire may be wound on the same bobbins.

Both of the latter features insure even layers of wire and the maximum footage of wire on each bobbin, regardless of the size of the bobbins or the wire, within the limits of practicability.

Indexing mechanism

Referring now to Figs. 7, 9, 10, 35, 36 and 38 for a detailed description of the indexing mechanism, which moves the wire guide and flipper assembly 116 from one station to another for winding successive bobbins, again the two sides of the machine are identical, so that only one side need be described. As best shown in Figs. 9 and 10, the machine is provided with weights 186 which are connected to extension 132 of the index slide block by a chain 187 which passes over a sprocket 188. A chain 189 is likewise connected to the extension 132 and is wound around a large sprocket 191. Sprocket 191 is secured to a sprocket shaft 192 provided with bearings 193 supported by the frame 1. A second sprocket 194 is secured to the shaft 192 and a second chain 195 is wrapped around the sprocket 194. Chain 195 has one end connected to the sprocket 194, passes over a sprocket 200, to an extension 196 of a piston rod 197 for a piston 198 of an air cylinder 199. A third chain 195a has one end connected to and passes over a sprocket 194a also secured to the sprocket shaft 192. The opposite end of chain 195a is connected to the extension 53 of the tail-stock assembly.

The air cylinder 199 is supplied with compressed air through a conduit 201 under control of a valve 202 operated by a foot-pedal 203. When the piston 198 is in its lowermost position, the weight 186 is drawn to its uppermost position because the chain 195 is unwound from sprocket 194, chain 195a is also pulled taut to exert releasing force on tail-stock extension 53 and chain 189 is wound on sprocket 191 to pull the chain attached to indexing mechanism extension 132 and thus raise the weight 186. As the weight 186 descends under control of the indexing mechanism, the chain 195 is wound on sprocket 194 and chains 189 and 195a unwind since the sprockets are connected together by the pulley shaft 192.

The bobbin winding operation starts with the indexing mechanism in the position shown in Fig. 9. The foot pedal 203 has been operated to raise the weight 186 and to draw the index slide block 131, wire guide and flipper assembly 116 and extension 132 toward the center of the machine. The outer bridge 130 of the index slide block 131 engages assembly 116 to move it to the seating position. If the electric motor 6 is operating and the clutches 8 are engaged, the machine starts to wind the first bobbins 32 and when the bobbin is filled, the index slide blocks 131 are moved to new stations and the second bobbins are wound, and so on until the ten bobbins are all wound, it being obvious that each end of the machine may be operated independently of the other. The following parts control the movement of the indexing mechanism.

Referring specifically to Figs. 5, 9, 35, 36, 38 and 39, it is again pointed out that the wire guide and flipper assembly 116 is mounted on and carried by the index slide block 131 and provides a guide for feeding wire 33 to the bobbins 32. Furthermore, the index slide block 131 is held in yielding engagement with the notches 125 on the shuttle rods 121 by the spring pressed ball 126.

Figure 41:
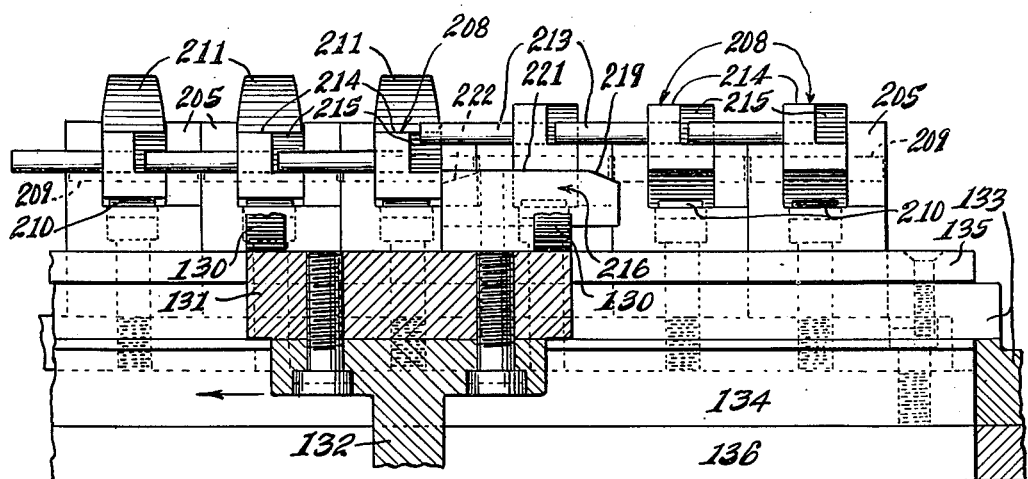
Fig. 41 is a sectional view taken on line XXXXI—XXXXI of Fig. 40.

As best shown in Figs. 5 and 36 a plurality of index lever brackets 205 are secured to a plate 207 on an extension 206 of the slide block base 133 and a plurality of index levers 208 are pivoted on horizontal pivot shafts 209 supported by the index lever brackets 205. Ten index levers 208 are provided one for each bobbin on the respective arbors. As shown in Figs. 36 and 41, each index lever 208 comprises a rounded wire follower 211 adjacent the bobbin end thereof. A leaf spring 210 is secured to each bracket 205 and tends to retain wire follower 211 against the wire being wound on respective bobbins. The wire follower 211 is held on the index lever 208 by screw 212 so it is readily replaceable if worn. The opposite end of the index lever 208 is provided with a pin 213 extending horizontally in one direction therefrom. One portion of the index lever 208 at this latter end is flat as shown at 214 and an adjacent portion is provided with a curved surface at 215, for the purpose of retaining an adjacent index finger 208 in a raised position when a bobbin is filled with wire, in a manner hereinafter described.

Figure 40:
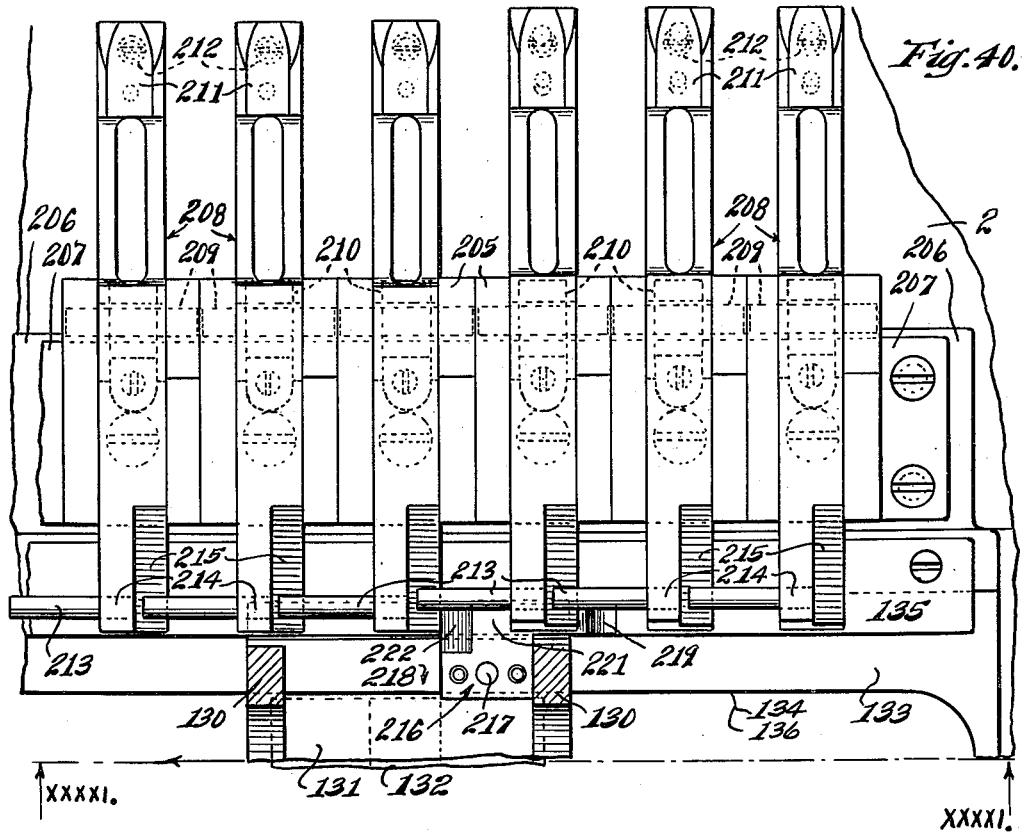
Fig. 40 is a detail view of the stop shoe for the indexing mechanism showing the index levers in various positions.

A stop shoe 216 shown in Figs. 36, 38 and 41, and in detail in Fig. 40, is carried by the index slide block 131, being secured thereto by a dowel pin 217. The index slide block 131 is slightly recessed, as shown at 218 in Figs. 36 and 40, for the reception of the stop shoe 216.

The upper surface of the stop shoe 216 is formed with a beveled surface 219, a flat surface 221 and another partially beveled surface 222, for a purpose hereinafter described. The stop shoe 216 in the position shown in Fig. 41 is stopped by the side of the second index arm 208, so that the second bobbin 32 may be wound by its own rotation and the oscillation of the shuttle rods 121 and wire guide and flipper assembly 116, before the indexing mechanism moves these parts to the next station.

As soon as the bobbin 32 is filled, its wire follower 211 rotates its index lever 208 above the beveled edge 222 of stop shoe 216. This immediately permits the weight 186 to drop and pull the chain 187, pulling extension 132 and index slide block 131 away from the center of the machine, overcoming the yieldable resistance of the spring pressed ball 126 in the notch 125 of the shuttle rod 121. The inner bridge member 130 engages the assembly 116 to overcome the resistance of ball 126 and move the assembly to the next station. The shoe 216 and therefore, the index slide block 131 are stopped at the next bobbin station by the next index lever 208 which is in its lowered position.

The inner index lever 208 which has been raised is retained on the flat surface 221 of shoe 216 and the surface 221 is high enough to lift the wire follower 211 out of contact with the wire on the wound bobbin, so that the follower will not scratch the wire. When the indexing mecha- nism moves to the next station, the pin 213 on the last adjacent index lever to be raised by follower 211 slides over the curved surface 215 of the last index lever to be raised, and the last adjacent index lever to be raised is held in its upper position, and so on sequentially, so that all the followers 211 except the outermost one are disengaged from the wire on their corresponding spools. This is best shown in Fig. 41.

The beveled surface 219 on the stop shoe 216 insures that the stop shoe will not stick on an index lever which might be slightly out of position, when the stop shoe is traveling back to its starting position at the center of the machine when weight 186 is raised.

*Flipper mechanism*

In order to quickly flip the wire 33 from one bobbin 32 to the next bobbin and to dispense with cutting the wire when the indexing mechanism moves the index slide block 131 and wire guide and flipper assembly 116 to the next bobbin station, the following mechanism, as best shown in Figs. 9, 35, 36 and 39, is utilized.

A flipper pin bracket 223 in the shape of an inverted U is bolted to the index mechanism base 133 and has nine flipper pins 224 inserted in the upper leg of the U, one for each of the bobbins 32 except the last bobbin. A flipper pin striker and block 225 is pivotally mounted at the edge of the assembly 116 adjacent the flipper pins and in position to be engaged thereby when the striker 225 is moved past any one of the flipper pins 224, upon movement of the indexing slide block 131 and the assembly 116 to a next bobbin station. As stated before, the wire guide and flipper pin assembly 116 is pivotally mounted on the pivot stud 118. An arm 227 is provided on the side of the distributor block 117 and a tension spring 228 is attached between the arm 227 and the guide and flipper assembly 116. When the striker 225 moves past a flipper pin 224, the spring 228 is placed under considerable tension, and as soon as the striker 225 is released, the assembly 116 snaps back to normal position. A stop pin 117a mounted on block 117 stops the motion of assembly 116 in a central position. The movement of the striker 225 past a pin 224 quickly flips the wire over to the next bobbin by fast movement of the wire guide arms 79 for the wire. It is obvious that the relatively light assembly 116 has much less inertia than the heavy index slide block and associated parts, including chains, pulleys and weights and the action in flipping the wire over is very fast. A coil spring 226 rotates the striker 225 about its pivot and back to its normal position when the striker 225 strikes the pins 224 when the assembly 116 is moved back to its starting position. Shoulders 229 and 230 on the striker 225 and body of assembly 116 prevent rotation of the striker 225 relative to the assembly 116 when the assembly 116 is moved sequentially to successive winding stations.

The guide arm end of the wire guide and flipper assembly 116 is pivoted at 231 and locked in desired position by pins 232. Shims 233 of various thicknesses, one of which is shown in Figs. 37 and 38, are insertable in a divided guide arm holder 234 so that the distance between the guide arms may be changed for different thicknesses of wire. Slotted openings 235 and 236 and lock bolts are provided for the insertion of shims 233 of various thicknesses.

Arbor release

Referring now to Figs. 9, 10, 18 and 22, for a detailed description of the arbor release and associated parts, the bearing member 52 which is integrally formed with the movable tail-stock casing 43, is provided with a central bore 238 for a spring shaft 239, and two adjacent bearing bores 237 for guide shafts 247, the same shafts 239 and 247 being used for both tail-stocks, as shown in Fig. 18. Shaft blocks 241 are secured to the bed plate 2 at opposite sides of the bearing member 52, the central shaft block 241 being provided with collars 242. The central bore 238 is enlarged at 243 to provide an internal shoulder 244. A compression coil spring 245 surrounds the shaft 239 and abuts against the collar 242 and the shoulder 244, thereby biasing the tail stock assembly 38 toward the arbor 30 to hold it in position. As stated before, an extension 53 on the bearing member 52 extends through a slotted opening 246 in the bed plate 2 and chain 195 is attached to the extension 53.

As is apparent, when compressed air is applied to cylinder 199 to lower piston 198 and raise weight 186, the chain 195a is pulled horizontally and eventually pulls on extension 53 and overcomes the force of spring 245 to move the tail-stock assembly 38 slightly toward the center of the machine, thereby permitting the arbor 30 with a group of wound bobbins to be removed from between the head-stock and tail-stock. Obviously, before this is done, the machine is stopped either manually or automatically by an electrical control of conventional design, (not shown) thus disengaging the clutch 8 on one side which is filled; or the clutches 8 may be disengaged manually. The end of the wire 33 is also cut and disposed in a hole 57 in the flange of the last bobbin 32.

Operation

The operation of the multiple bobbin winding machine is as follows. Wire supply spools reels 55 are placed on the platform 5. Air pressure is applied to the air cylinder 199 by pressing down on foot pedals 203 to open air valves 202 and lower piston 198, whereby the tail-stock 38 is moved to the arbor loading position and the weights 186 raised. The arbors 30 loaded with empty bobbins 32 are disposed between the head-stock 23 and the tail-stock 38. The pedals 203 are then released and spring 245 retains arbor 30 in position. The index mechanism slide block is also moved to its extreme inward position by rotation of sprocket 191 when air piston 198 is lowered. The condition of the machine at this time is shown generally in Fig. 9.

The wire 33 is threaded through one of the apertures 66 in unreeling arm 64, thence through the bore 67 in the rotating spindle 61 and then back and forth over sheaves 68 and 74, over fixed sheave 75 through the wire guide and member 77 of the wire guide and flipper assembly 116, through the guide arms 79 and the end of the wire is held in the aperture 56 in the hub 40 of the bobbin 32 closest to the center of the machine. The same procedure is, of course, followed for both sides of the machine, if it is desired to operate both sides, so that, normally, two bobbins are being wound at the same time. However, the same positioned bobbin on each side of the machine may be wound at different times.

The electric motor 6 is then started, and the distributor mechanism 54 is operated immediately since it is driven by pulley 9 which is mounted on motor shaft 7 and drives belt 144, pulley 143 and gears 142 and 147 in the distributor assembly 54. The clutches 8 are then fully engaged and the arbors 30 are rotated by being driven through pulleys 17 and 21 and belt 19. Wire 33 is, therefore, wound on the bobbins 32 in layers by reason of the oscillation of the shuttle rods 121 by the cam 154 in the distributor mechanism 54, in the manner hereinbefore described.

The machine may be started by starting the electric motor with the clutches fully engaged or the clutches may be thrown in at once because the sudden pull on the wire is taken up by moving the pivoted arm 72 with the sheave 74 thereon toward the right against spring 88, and as the starting tension decreases, arm 72 moves toward the left again. The wire 33 is, therefore, not broken.

As the wire 33 builds up on the bobbin 32 the bobbin tends to pull the wire faster and the tension on the wire 33 is increased. This draws the brake arm 72 toward the right about pivot 73 in Fig. 4, and loads the heavier spring 88.

As the first bobbin 32 fills up with wire 33, the wire follower 211 for the first bobbin 32 is lowered by the wire on the bobbin and rotates the first index lever 208 about its pivot shaft 209. When the bobbin is completely filled, the index lever is raised sufficiently to clear the stop shoe 216 and the weight 186 draws the entire index slide block 131 with the wire guide and flipper assembly 116 to the next bobbin station, where it is stopped by the stop shoe 216 engaging the next index lever 208. As the flipper block 225 moves past the adjacent flipper pin 224, the spring 228 snaps the flipper block 225 back into position. A flipping movement is obviously imparted to the wire guide and flipper assembly about the pivot stud 118. The wire 33 is thereby thrown to the far side of the next bobbin and starts to wind thereon.

The tension on the wire 33 is suddenly relaxed when the wire is thrown over to the next bobbin 32 and the spring 88 quickly responds to the decrease in tension and forces the brake arm 72 to the left in Fig. 4, thereby overcoming the force of spring 100a and quickly applying pressure on brake material 102 to slow down or stop the unreeling of the wire from the reels 55. This prevents snarling and breaking of the wire when it shifts from one bobbin to the next. The same operation occurs if the wire accidentally breaks and prevents further unreeling of wire. Furthermore, the slack in the line is quickly taken up because the distance between the sheaves 68 and 74 is suddenly increased. The throw of the line going from high to low speed is therefore, taken up.

When the empty bobbin starts filling, under one set of actual working conditions, the wire is being fed at the rate of 300 feet per minute. A filled bobbin is fed at between 1000 to 1200 feet per minute. When the wire is flipped to an empty bobbin in a fraction of a second, the sudden change to a lower speed results in a tendency to throw wire ahead, but the brake operates almost instantaneously to slow down or stop the feed of wire for a short time, on the order of one second or less.

When all the bobbins 32 are filled, the rotation of the arbors 30 may be stopped by disengaging the clutches 8, or the machine may be provided with an automatic electrical control for disengaging the clutches. No such control is shown since it is a standard piece of equipment.

When the machine is stopped, and the end of the wire is placed in one of the holes in the flange, the arbor is loosened by applying air to the air cylinder 199, thus pulling the tail-stock assembly 38 against the face of the spring 245. The wire is then cut between each bobbin and the bobbins removed from the arbor. The end of each wire is then placed in one of the holes in each bobbin flange to prevent the wire from unwinding.

From the foregoing it will be apparent that I have provided a winding machine which effects a considerable saving in labor. Under actual operating conditions it has been found that it only requires about one-half the time normally required to wind bobbins by other methods previously used. Furthermore, this machine winds the line evenly on the bobbins or cores and more feet of line per core results in additional savings in labor.

The machine is adapted to wind large size bobbins and to wind line of varying thicknesses. Furthermore, the machine is practically fully automatic, and breakage or snarling of line is substantially eliminated.

Some changes may be made in the construction and arrangement of the parts of the winding machine without departing from the real spirit and purpose of the invention and it is the intention to cover by the claims, any modified forms of construction or use of mechanical equivalents, which may be reasonably included within their scope.

I claim as my invention:

1. An indexing mechanism for a machine for winding a single line sequentially onto a plurality of cores comprising a rotary core support, means for rotating said rotary core support and cores thereon, means for starting and stopping the rotation of said support and cores, a supply of line for winding line on one core at a time on said rotary core support, said indexing mechanism comprising an index slide block, a line guide pivotally secured to said block, a plurality of stops for said index slide block, one of said stops being associated with each of said cores, means on said index slide block for sequentially engaging said stops, means for oscillating said index slide block and line guide to feed line in layers onto said cores, means for moving said index slide block to the adjacent stop when one of said stops is released, means for releasing said stops in sequence responsive to the sequential filling of said cores with said line, and means for quickly rotating said line guide as said indexing mechanism moves the line guide from a full core to an empty core.

2. An indexing mechanism for a machine for winding a single line sequentially onto a plurality of cores comprising a rotary core support, means for rotating said rotary core support and cores thereon, means for starting and stopping the rotation of said support and cores, a supply of line for winding line on one core at a time on said rotary core support, said indexing mechanism comprising an index slide block, a line guide pivotally secured to said block, a plurality of stops for said index slide block, one of said stops being associated with each of said cores, means on said index slide block for sequentially engaging said stops, means for oscillating said index slide block and line guide to feed line in layers onto said cores, means for moving said index slide block to the adjacent stop when one of said stops is released, means for releasing said stops in sequence responsive to the sequential filling of said cores with said line, and means for quickly rotating said line guide as said indexing mechanism moves the line guide from a full core to an empty core, said means for rotating said line guide comprising a plurality of flipper pins, and an extension on said line guide adapted to respectively engage said flipper pins as the indexing mechanism moves the line guide past the flipper pins.

3. An indexing mechanism for a machine for winding a single line sequentially onto a plurality of cores comprising a rotary core support, means for rotating said rotary core support and cores thereon, means for starting and stopping the rotation of said support and cores, a supply of line for winding line on one core at a time on said rotary core support, said indexing mechanism comprising an index slide block, a line guide pivotally secured to said block, a plurality of stops for said index slide block, one of said stops being associated with each of said cores, means on said index slide block for sequentially engaging said stops, means for oscillating said index slide block and line guide to feed line in layers onto said cores, means for moving said index slide block to the adjacent stop when one of said stops is released, means for releasing said stops in sequence responsive to the sequential filling of said cores with said line, means for quickly rotating said line guide as said indexing mechanism moves the line guide from a full core to an empty core, said means for rotating said line guide comprising a plurality of flipper pins, an extension on said line guide adapted to engage said flipper pins as the indexing mechanism moves the line guide past the flipper pins, and resilient means secured to said slide block and to said pivoted line guide for returning the line guide to its normal position.

4. An indexing mechanism for a machine for winding a single line sequentially onto a plurality of cores comprising a rotary core support, means for rotating said rotary core support and cores thereon, means for starting and stopping the rotation of said support and cores, a supply of line for winding line on one core at a time on said rotary core support, said indexing mechanism comprising an index slide block, a line guide pivotally secured to said block, a plurality of stops for said index slide block, said stops each comprising an elongated lever, means for pivotally supporting each of said levers, one of said levers being associated with each of said cores, means on said index slide block for sequentially engaging said levers, means for oscillating said index slide block and said line guide to feed line in layers onto said cores, and means for moving said index slide block to an adjacent lever when one of said levers is released, one end of said levers being adapted to contact the line on said cores to sequentially release the levers upon sequential filling of said cores with said line.

5. An indexing mechanism for a machine for winding a single line sequentially onto a plurality of cores comprising a rotary core support, means for rotating said rotary core support and cores thereon, means for starting and stopping the rotation of said support and cores, a supply of line for winding line on one core at a time on said rotary core support, said indexing mechanism comprising an index slide block, a line guide pivotally secured to said block, a plurality of stops for said index slide block, said stops each comprising an elongated lever, means for pivotally supporting each of said levers, one of said levers being associated with each of said cores, means on said index slide block for sequentially engaging said levers, means for oscillating said index slide block and said line guide to feed line in layers onto said cores, and means for moving said index slide block to an adjacent lever when one of said levers is released, one end of said levers being adapted to contact the line on said cores to sequentially release the levers upon sequential filling of said cores with said line, the other end of said levers being provided with a curved surface and with a horizontally extending pin, said curved surface adapted to contact the pin of an adjacent lever to retain said adjacent lever in a raised position.

6. An indexing mechanism for a machine for winding a single line sequentially onto a plurality of cores comprising a rotary core support, means for rotating said rotary core support and cores thereon, means for starting and stopping the rotation of said support and cores, a supply of line for winding line on one core at a time on said rotary core support, said indexing mechanism comprising an index slide block, a line guide pivotally secured to said block, a plurality of stops for said index slide block, said stops each comprising an elongated lever, means for pivotally supporting each of said levers, one of said levers being associated with each of said cores, means on said index slide block for sequentially engaging said levers, means for oscillating said index slide block and said line guide to feed line in layers onto said cores, means for moving said index slide block to an adjacent lever when one of said levers is released, one end of said levers being adapted to contact the line on said cores to sequentially release the levers upon sequential filling of said cores with said line, the other end of said levers being provided with a curved surface and with a horizontally extending pin, said curved surface adapted to contact the pin of an adjacent lever to retain said adjacent lever in a raised position, and resilient means for retaining said one end of said lever in contact with the line being wound on a core.

7. An indexing mechanism for a machine for winding a single line sequentially onto a plurality of cores comprising a rotary core support, means for rotating said rotary core support and cores thereon, means for starting and stopping the rotation of said support and cores, a supply of line for winding line on one core at a time on said rotary core support, said indexing mechanism comprising an index slide block, a line guide pivotally secured to said block, a plurality of stops for said index slide block, said stops each comprising an elongated lever, means for pivotally supporting each of said levers, one of said levers being associated with each of said cores, means on said index slide block for sequentially engaging said levers, means for oscillating said index slide block and said line guide to feed line in layers onto said cores, means for moving said index slide block to an adjacent lever when one of said levers is released, one end of said levers being adapted to contact the line on said cores to sequentially release the levers upon sequential filling of said cores with said line, the other end of said levers being provided with a curved surface and with a horizontally extending pin, said curved surface adapted to contact the pin of an adjacent lever to retain said adjacent lever in a raised position, and a removable line follower provided on said one end of the lever.

8. A line guide and flipper assembly for a machine for winding a single line sequentially onto a plurality of cores comprising a rotary core support, means for rotating said rotary core support and cores thereon, a supply of line for winding line on one core at a time on said rotary core support, distributing mechanism for oscillating said line guide and flipper assembly for winding line in parallel layers on said cores, a slidable index block for supporting said line guide and flipper assembly and an indexing mechanism for moving said line guide and flipper assembly from a position for feeding line to one core to a position for feeding line to the adjacent empty core, said line guide and flipper assembly comprising a main body portion, means for pivotally supporting said main body portion on said index slide block, a line guide arm mounted on said main body portion, a spring biased flipper block pivotally supported on said main body portion and having a shoulder normally engaging the main body portion, a front piece mounted on said main body portion adjacent said cores, a line director mounted on said front piece, and a plurality of flipper fingers for engaging and releasing said flipper block to rotate said main body portion and said line director about said pivot to flip said line to an adjacent empty core and resilient means for returning the main body portion to its normal position.

9. A line guide and flipper assembly for a machine for winding a single line sequentially onto a plurality of cores comprising a rotary core support, means for rotating said rotary core support and cores thereon, a supply of line for winding line on one core at a time on said rotary core support, distributing mechanism for oscillating said line guide and flipper assembly for winding line in parallel layers on said cores, a slidable index block for supporting said line guide and flipper assembly, releasable resilient means for supporting said line guide and flipper assembly on said index block, an indexing mechanism for moving said line guide and flipper assembly from a position for feeding line to one core to a position for feeding line to the adjacent empty core, said line guide and flipper assembly comrising a main body portion, means for pivotally supporting said main body portion on said index slide block, a line guide arm mounted on said main body portion, a spring biased flipper block pivotally supported on said main body portion and having a shoulder normally engaging the main body portion, a front piece mounted on said main body portion adjacent said cores, a line director mounted on said front piece, a plurality of flipper fingers for engaging and releasing said flipper block to rotate said main body portion, and said line director about said pivot to flip said line to an adjacent empty bobbin and resilient means for returning the main body portion to its normal position.

10. A line guide and flipper assembly for a machine for winding a single line sequentially onto a plurality of cores comprising a rotary core support, means for rotating said rotary core support and cores thereon, a supply of line for winding line on one core at a time on said rotary core support, distributing mechanism for oscillating said line guide and flipper assembly for winding line in parallel layers on said cores, a slidable index block for supporting said line guide and flipper assembly, releasable resilient means for supporting said line guide and flipper assembly on said index block, an indexing mechanism for moving said line guide and flipper assembly from a position for feeding line to one core to a position for feeding line to the adjacent empty core, said indexing mechanism including a bridge member for engaging the line guide and flipper assembly and overcoming the force of said resilient supporting means upon movement of the indexing mechanism, said line guide and flipper assembly comprising a main body portion, means for pivotally supporting said main body portion on said index slide block, a line guide arm mounted on said main body portion, a spring biased flipper block pivotally supported on said main body portion and having a shoulder normally engaging the main body portion, a front piece mounted on said main body portion adjacent said cores, a line director mounted on said front piece, a plurality of flipper fingers for engaging and releasing said flipper block to rotate said main body portion and said line director about said pivot to flip said line to an adjacent empty core and resilient means for returning the main body portion to its normal position.

11. A line guide and flipper assembly for a machine for winding a single line sequentially onto a plurality of cores comprising a rotary core support, means for rotating said rotary core support and cores thereon, a supply of line for winding line on one core at a time on said rotary core support, distributing mechanism for oscillating said line guide and flipper assembly for winding line in parallel layers on said cores, a slidable index block for supporting said line guide and flipper assembly and an indexing mechanism for moving said line guide and flipper assembly from a position for feeding line to one core to a position for feeding line to the adjacent empty core, said line guide and flipper assembly comprising a main body portion, means for pivotally supporting said main body portion on said index slide block, a line guide arm mounted on said main body portion, a spring biased flipper block pivotally supported on said main body portion and having a shoulder normally engaging the main body portion, a front piece mounted on said main body portion adjacent said cores, a line director mounted on said front piece, the said line director comprising a pair of arms between which the line passes, said arms being adjustable for various thicknesses of wire, and a plurality of flipper fingers for engaging and releasing said flipper block to rotate said main body portion and said line guide and director about said pivot to flip said line to an adjacent empty core and resilient means for returning the main body portion to its normal position.

LLOYD R. RINEHART.

REFERENCES CITED

The following references are of record in the file of this patent:

UNITED STATES PATENTS

| Number | Name | Date |
|---|---|---|
| 282,580 | Smith | Aug. 7, 1883 |
| 805,265 | Cowles et al. | Nov. 21, 1905 |
| 1,589,435 | Scott | June 22, 1926 |
| 1,832,446 | Boe | Nov. 17, 1931 |
| 1,834,993 | Atwood | Dec. 8, 1931 |
| 1,836,815 | Reeves | Dec. 15, 1931 |
| 1,856,004 | Thomas | Apr. 26, 1932 |
| 1,988,437 | Brillhart et al. | Jan. 22, 1935 |
| 2,002,770 | Field | May 28, 1935 |
| 2,186,106 | Hargreaves et al. | Jan. 9, 1940 |
| 2,248,832 | Taylor | July 8, 1941 |
| 2,269,299 | Wiggins | Jan. 6, 1942 |
| 2,286,460 | Brown | June 16, 1942 |
| 2,328,322 | Berthold | Aug. 31, 1943 |
| 2,363,677 | Kirk | Nov. 28, 1944 |
| 2,388,121 | Carbonneau | Oct. 30, 1945 |
| 2,401,676 | Weber | June 4, 1946 |
| 2,460,723 | Weesner | Feb. 1, 1949 |

FOREIGN PATENTS

| Number | Country | Date |
|---|---|---|
| 3,045 | Great Britain | Oct. 29, 1867 |